United States Patent [19]

Benjamin

[11] 4,455,754

[45] Jun. 26, 1984

[54] POSITION SENSING DEVICE

[75] Inventor: Harry L. Benjamin, Dayton, Ohio

[73] Assignee: Centro Corporation, Dayton, Ohio

[21] Appl. No.: 349,877

[22] Filed: Feb. 23, 1982

Related U.S. Application Data

[63] Continuation-in-part of Ser. No. 152,220, May 22, 1980, Pat. No. 4,328,621, which is a continuation-in-part of Ser. No. 109,722, Jan. 4, 1980, abandoned, which is a continuation-in-part of Ser. No. 843,414, Oct. 9, 1977, abandoned.

[51] Int. Cl.³ .............................................. G01B 7/30
[52] U.S. Cl. ................................................. 33/174 L
[58] Field of Search ......... 33/174 L, 185 R, DIG. 13; 73/781; 338/2, 4, 5, 6

[56] References Cited

U.S. PATENT DOCUMENTS

| 2,546,155 | 3/1951 | Haber et al. | 73/781 X |
| 3,307,267 | 3/1967 | Barr et al. | 33/174 L |
| 3,864,835 | 2/1975 | Morisaki | 33/174 E |
| 4,060,906 | 12/1977 | Heizmann | 33/DIG. 13 |
| 4,101,405 | 7/1978 | Inoue | 204/224 M |
| 4,172,324 | 10/1979 | Meyer | 33/174 E |

FOREIGN PATENT DOCUMENTS 356918 10/1961 Switzerland .
511420 9/1971 Switzerland .
545673 2/1974 Switzerland .

OTHER PUBLICATIONS

"Checking Angular Faces–II", *Practical Engineering*, Dec. 9, 1949, pp. 614–615.

*Primary Examiner*—Charles A. Ruehl
*Attorney, Agent, or Firm*—Biebel, French & Nauman

[57] ABSTRACT

A position sensing device for indicating the relative position of the device with respect to an external surface. A main support member houses a plurality of angular position sensing probes which are each associated with transducers that provide an indication of the relative position of each probe to the support member so that when the probes engage an external surface, information is provided which can be used to indicate the relative position of the device with respect to the external surface. An additional lateral position sensing probe can also be mounted in the support member to indicate exact axial alignment with a hole or other discontinuity in the external surface.

6 Claims, 38 Drawing Figures

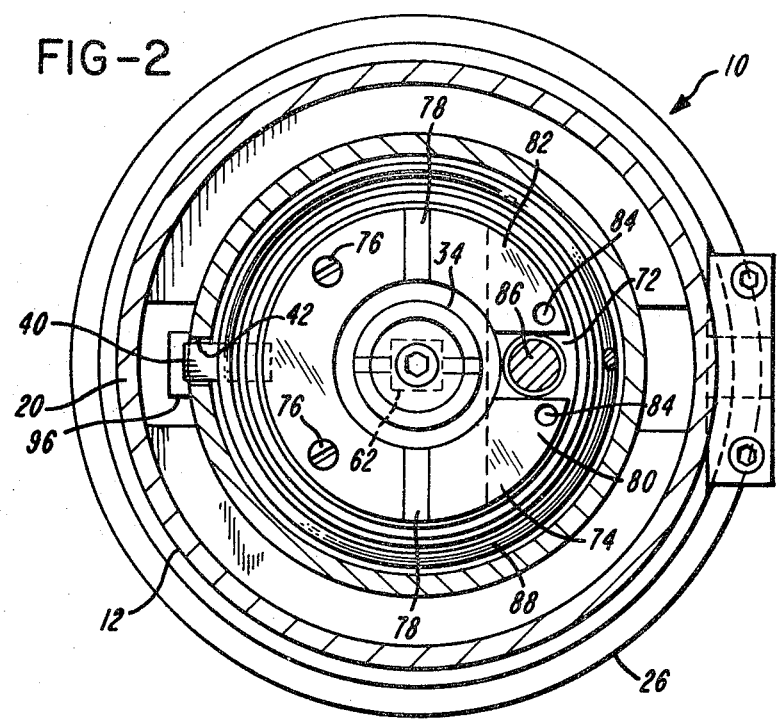
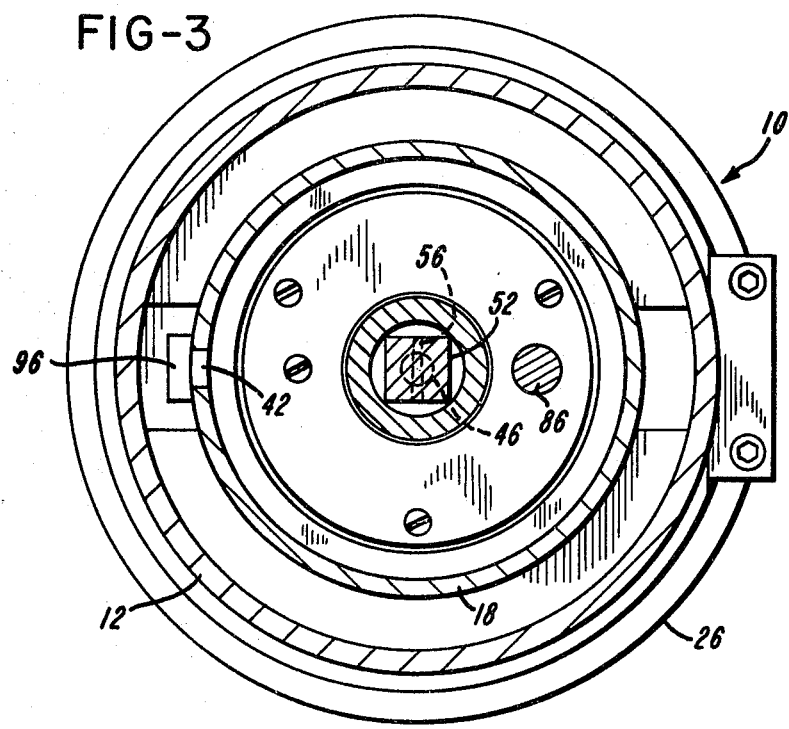

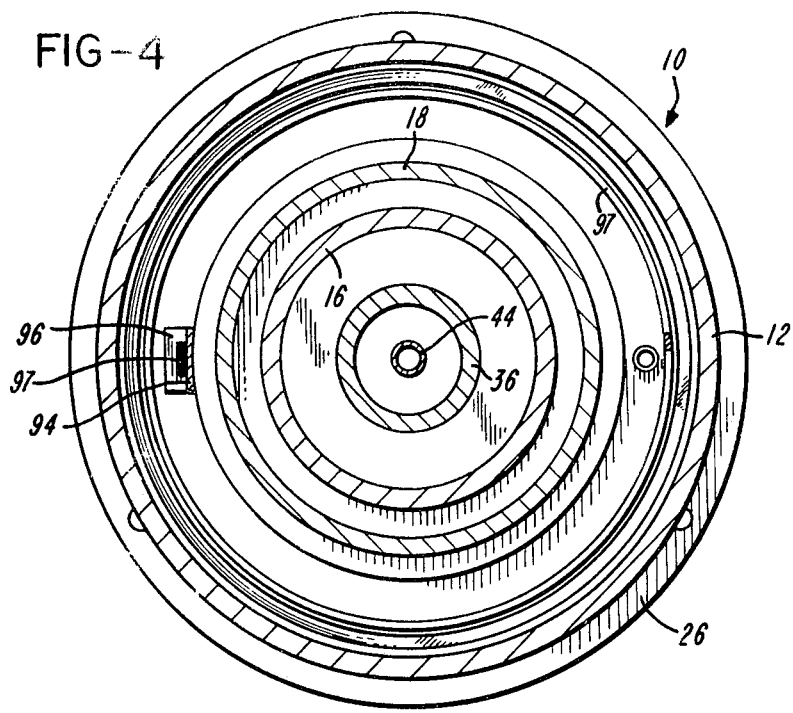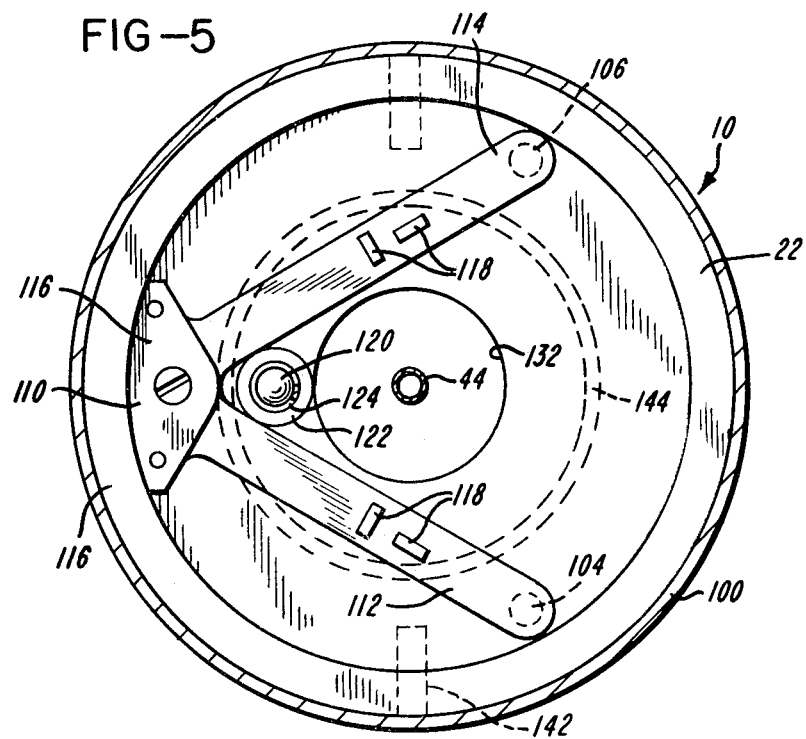

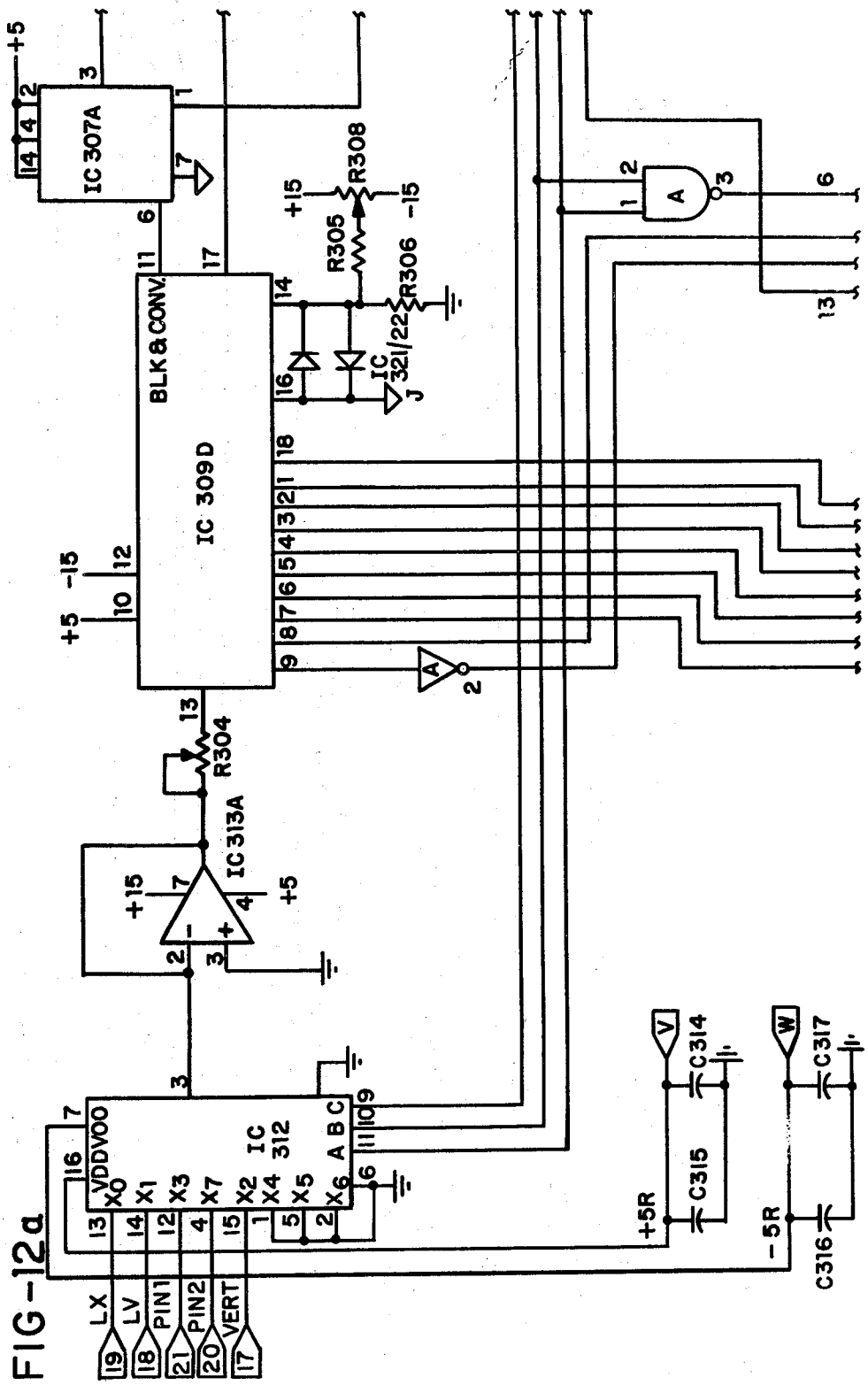

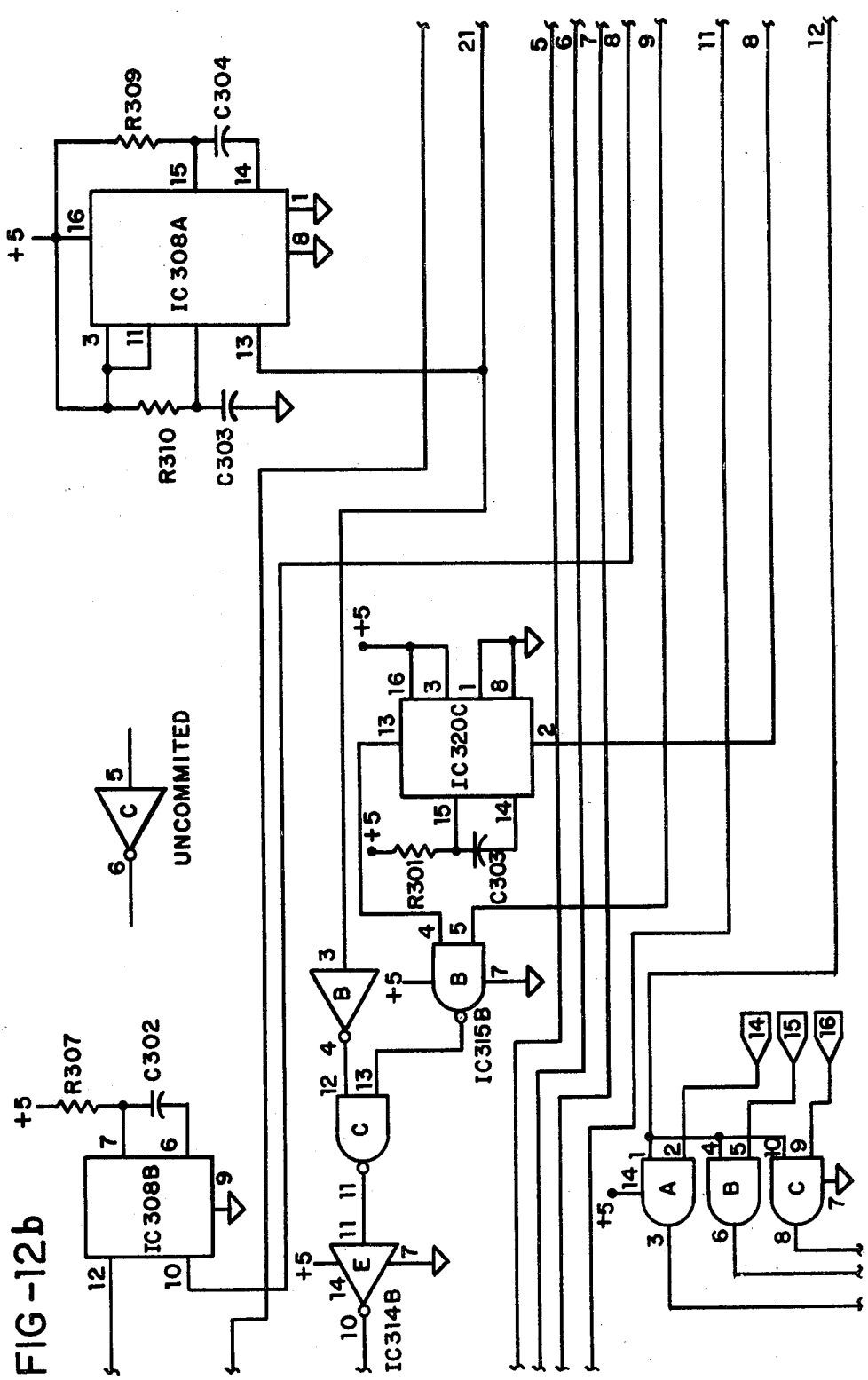

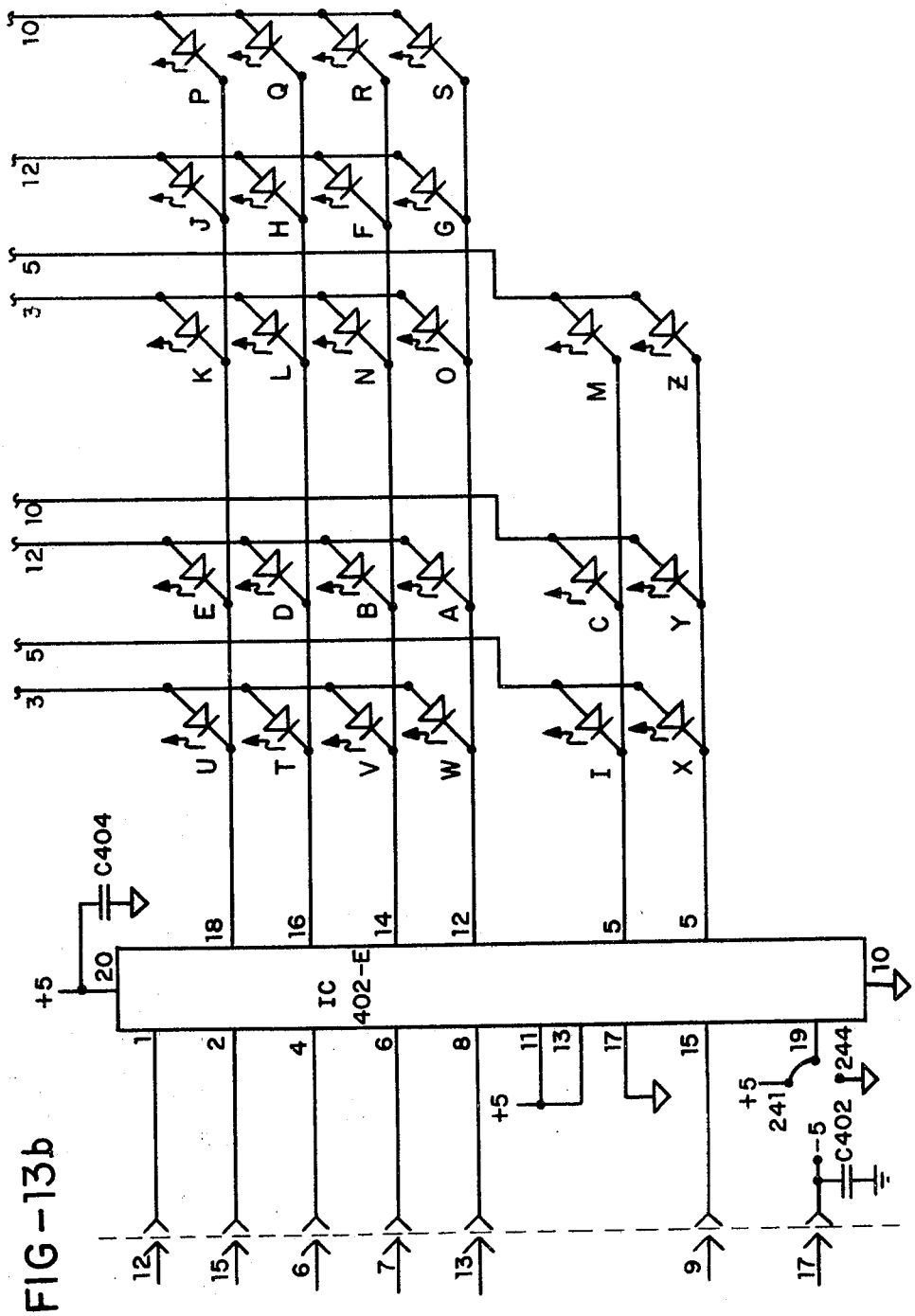

| BUS | | | |
|---|---|---|---|
| | 1 | A | |
| +5 | 2 | B | +5 |
| +5* | 3 | C | CLOCK A |
| +5* | 4 | D | CLOCK B |
| ↓* | 5 | E | CLOCK C |
| ↓* | 6 | F | CLOCK D |
| | 7 | H | |
| | 8 | J | |
| | 9 | K | |
| | 10 | L | |
| | 11 | M | |
| | 12 | N | |
| | 13 | P | |
| VERT O/R | 14 | R | |
| PROBE OUT OF HOLE | 15 | S | |
| ABOVE TARGET | 16 | T | |
| V | 17 | U | |
| HX | 18 | V | +5R ⎫ Ⓐ |
| HY | 19 | W | −5R ⎭ |
| PX | 20 | X | −15 |
| PY | 21 | Y | ⏚ |
| −1.2 REF | 22 | Z | +15 |

…

POSITION SENSING DEVICE

This application is a continuation-in-part of application Ser. No. 152,220 filed May 22, 1980, now U.S. Pat. No. 4,328,621, which was a continuation-in-part of application Ser. No. 109,722 filed Jan. 4, 1980, now abandoned, which was a continuation-in-part of Ser. No. 843,414 filed Oct. 9, 1977, now abandoned.

BACKGROUND OF THE INVENTION

1. Field of the Invention

The present invention relates to devices for sensing the relative position between such a device and an external surface, through the use of contacting probes which extend from the device to the surface.

2. Prior Art

This invention is an improvement over that disclosed in, for example, my prior co-pending application Ser. No. 152,220 filed May 22, 1980 now U.S. Pat. No. 4,328,621, issued May 11, 1982, which is assigned to the same assignee as the present invention. These devices generally provide a means for sensing the relative position of the device with respect to an external surface so as to provide an indication of the relative perpendicularity or angularity of the device with respect to that surface. Additional features of these devices include the ability to indicate the distance from the device to the external surface and the ability to indicate an exact position of a discontinuity in the surface, such as a hole. All of these functions are particularly useful in "teaching" industrial robots which are capable of remembering a location of a position in space once the robot has been moved to that location. Obviously, many of the various features of these devices are useful in many other industries also.

Prior to my developemnt of these devices, it was a common practice to teach such industrial robots by bringing the robot arm into approximate alignment with the surface, through visual observations and utilizing the driving mechanism of the robot. This is a very tedious operation requiring considerable labor and skill and was thus uneconomical for most applications.

SUMMARY OF THE INVENTION

The present invention provides a position sensing device which indicates the relative perpendicularity or angularity between the device and a surface, and in addition, if desired, can also provide an indication of the distance from the device to the surface, and further, can provide an exact alignment with a point on the surface. The position sensing device includes a support member supporting at least one angular position sensing probe movably mounted within and extending from the support member for engaging an external surface. At least one transducer means is mounted to the support member and engages each of the probes for sensing movement thereof and providing electrical signals indicative of the positions of each of the probes relative to the support member. Means are provided including circuitry for receiving the signals from the transducers and providing an indication of the relative angular position of the support member to the surface.

In one form, an additional reference probe is provided in the support member which is maintained stationary relative to the support member during normal operation of the device and provides a fixed reference point where it engages the external surface and with respect to which at least one other probe can be utilized to establish perpendicularity between the support member and the external surface.

Although all of the sensing and reference probes can extend from the support member and directly engage the surface of a workpiece as the external surface providing the reference point for the probe's information, an intermediate platten may also be utilized. Such a platten is movably mounted on the support member so as to engage the probes with an internal surface which is parallel to a further external surface which in turn engages the surface of the workpiece with respect to which the probe is to provide information. The platten is useful in protecting the reference and sensing probes and provides additional features which are discussed in the Detailed Description below.

In some of the embodiments of the present invention, the distance from the support member to the external surface with respect to which information is being gathered can be established through the movement of at least one of the sensing probes as it retracts into the support member, since the transducer associated with that sensing probe is providing a signal indicative of the relative position of that probe with respect to the support member.

Additionally, an external means of indicating the relative position between the external surface and the support member may be provided. This is particularly useful where a fixed reference probe is utilized since the support member is basically intended to pivot about the reference probe to establish the desired angularity or perpendicularity and thus this probe will not be moved toward or away from the external surface being examined.

Since, in the case of industrial robots for example, the distance that is really necessary to be measured is the distance from the robot arm supporting the device to the external surface, an intermediate housing can be provided in which the support member telescopes. Thus, by providing a further transducer means which indicates the relative position of the support member with respect to this housing, the relative position of the robot arm with respect to the external surface can be easily indicated.

Since, in many environments such as industrial robot useage, it is desirable to be able to permit relatively large movements between the external surface being examined and the robot arm supporting the position sensing device while the device is engaging the external surface, a relatively large length of movement must be provided in either the sensing probes or between the support member and the housing, depending upon which means is being used to sense the relative distance from the external surface to the robot arm.

It has been discovered that conventional linear transducers or potentiometers of the type commonly available to provide an indication of the movement of a rod therethrough, cannot provide the accuracy, repeatability and wear which is desirable. In the present invention, this difficulty is overcome by the use of strain gage technology associated with a cantilevered member mounted in the support member or the housing. The probe which provides the indication of movement between the external surface and the robot arm is provided with a tapered surface which acts as a camming surface for a cam follower which, in turn, causes deflection of the cantilevered member thus causing stain in that member which is readily ascertainable through the strain gages.

These gages can be easily calibrated to provide an exact indication of the relative position of the probe with respect to the support member and thus the distance from the external surface to the robot arm, for example. Simple adjustments in the angle of the camming surface can permit almost any reasonable length of stroke with highly accurate determination through the use of sensitive strain gages.

As mentioned above, it is also an alternative feature of the present invention to provide means of determining the lateral position of the position sensing device with respect to a discontinuity, such as a hole, in the external surface being examined and thus provide an indication of exact alignment of the support member with the hole. In its preferred form, this lateral position sensing probe is mounted for sliding movement within the support member so that it can be retracted to prevent damage, but otherwise is engaged with the external surface being examined.

When the tip of this probe engages a hole and extends into it as the lateral movement of the position sensing device continues, stress is placed on the probe since it is supported in a cantilever fashion from a stress sensing member. The stress sensing member is designed to indicate the direction relative to the support member as to which stress is being applied through movement of the probe in the hole. This information is then utilized to provide an indication to the operator of the direction in which he must move the position sensing device in order to exactly locate the lateral position sensing probe in the hole so as to eliminate any bending stress on the probe.

In its preferred form, the sensing member is provided with two perpendicular surfaces formed of relatively thin flat plates with strain gage transducers mounted to each surface. The information provided can thus be utilized to indicate the stress in each of the planes of these surfaces which then can easily be used as information to provide the operator with an indication of the direction in which he must move the position sensing device in order to relieve these stresses on the lateral position sensing probe.

BRIEF DESCRIPTION OF THE DRAWINGS

FIG. 2 is a cross sectional view along line 2—2 of FIG. 1;

FIG. 3 is a cross sectional view along line 3—3 of FIG. 1;

FIG. 4 is a cross sectional view along line 4—4 of FIG. 1;

FIG. 5 is a cross sectional view along line 5—5 of FIG. 1;

DETAILED DESCRIPTION OF THE PREFERRED EMBODIMENTS

Figure 1:
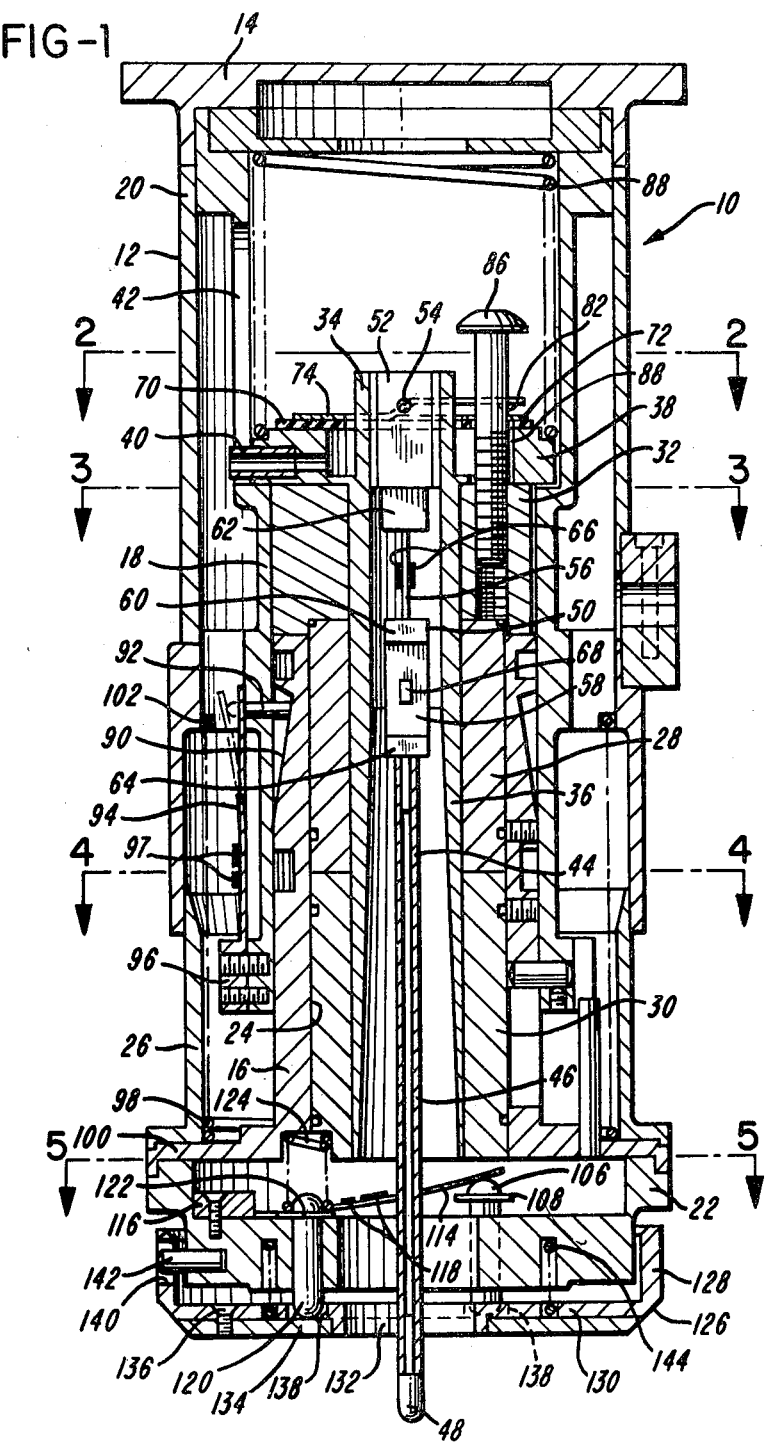
FIG. 1 is a cross sectional view of a preferred embodiment of the present invention.

The first embodiment of the position sensing device 10 is illustrated in FIG. 1 and is provided with a main outer cylindrical housing 12 which is closed at its upper end by a cap 14. Cap 14 is the portion of the device which will be directly attached to the robot arm (not shown) in the environment where this device would be utilized for "teaching" an industrial robot. Supported within this housing 12 is a main support member 16 which is telescopically received within the housing 12.

Support member 16 is likewise cylindrical in this embodiment, although it should be understood that the cylindrical shape of this device is not essential to its operation. The main support member 16 is actually fabricated from a plurality of individual pieces which function together to provide the main support for the instrumentation in the position sensing device 10, although the main support may be fabricated from a single piece, if desired.

Likewise, the outer housing 12 is formed of a plurality of parts in order to reduce the weight as well as permit ease of fabrication of the device. Thus, for example, the inner wall 18 of housing 12 is fabricated separately from the outer wall 20 and is threaded into the cap 14 to hold the inner wall 18 in position. The outer wall 20 then can be threaded to the upper portion of the inner wall 18 to hold the assembly securely together.

The main support member 16 includes a bottom cap 22 which is threadably received by an internal cylindrical wall 24 which extends into the outer cylindrical housing 12 and is telescopically received within the inner wall 18 thereof. An outer cylindrical wall 26 of support member 16 is threadably connected to the inner wall 24 and is telescopically received by the outer wall 20 of the cylindrical housing 12 for sliding movement therein.

Mounted within the inner wall 24 of support member 16 are cylindrical bushings 28 and 30 which are mounted fixed with respect to the inner wall 24 for movement therewith. A further cylindrical member 32 is mounted atop bushing 28 and is also mounted fixed relative to the inner wall 24 for movement therewith. Slidingly supported within the central openings as defined by bushings 28 and 30 and cylindrical member 32 is a lateral position sensing probe support member 34, also generally cylindrical in shape with a tapered lower portion 36 and with an upper portion that widens into a disk shaped cap 38. A hole is drilled into one side of the cap 38 and a guide pin 40 is securely fitted therein and extends outwardly into a mating slot 42 formed in the inner wall 18 of the cylindrical housing 12 so that the orientation of the lateral position sensing probe support member 34 is maintained in the same location at all times with respect to the outer housing 12.

Member 34 supports a lateral position sensing probe 44 for movement therewith telescopically within the housing 12 along the longitudinal axis of the probe which is concentric with the axis of the housing 12 as well as the support member 16. The lateral position sensing probe 44 is comprised of a hollow cylindrical rod 46 having a solid end cap 48 formed with a spherical end. The upper end of rod 46 is attached to a sensing block 50. The upper portion 52 of sensing block 50 is cylindrical and fits snuggly within the cylindrical bore in member 34. A pin 54 extends through the upper portion 52 and through member 34 to hold the sensing probe 44 in fixed position with respect to member 34.

Sensing probe 44 is formed with two relatively thin flat plates 56 and 58 which are formed in planes perpendicular to one another from a single block of material and with an intermediate rectangular cross section portion 60. The planes in which the plates 56 and 58 are formed intersect along the longitudinal axis of rod 46. A further rectangular upper portion 62 joins the portion 52 and a lower rectangular portion 64 has a cylindrical extension which is received in the upper portion of the rod 46 to hold the rod in a cantilevered fashion extending outwardly from the sensing device 10. The tapered lower portion 36 of the member 34 permits cantilevered movement of the lateral position sensing probe 44 over an extended lateral width so that the rod 46 does not contact any portion of the sensing device within that range of movement.

Mounted to the surfaces of plates 56 and 58 are strain gage transducers 66 and 68, respectively. These gages are mounted in a conventional manner to indicate the strains that occur in each of the plates 56 and 58 when the probe 44 is bent. The overall design of the probe is such that all bending takes place in the plates 56 and 58, thus the probe body 46 must be designed stiffer than these plates. It is to be noted that none of the lead wires from any of the strain gages discussed herein are illustrated for the sake of clarity. However, it is apparent that lead wires must extend from each of the strain gages referred to herein and out of the device and into the control circuitry described below.

Mounted to the disk shaped cap section 38 of member 34 is an annular plate 70 formed of electrically insulative material with a crescent shaped member 72, made of copper or other conductive material, mounted on the surface thereof and off to one side as illustrated in FIGS. 1 and 2. A further piece of conductive material in the form of a horseshoe shaped piece 74 is also mounted on the upper surface of the annular plate 70 and is secured thereto by bolts 76. The horseshoe shaped piece 74 is provided on each side with upwardly extending offset 78, as shown in FIG. 2, which causes the right side of the piece 74 to be elevated above the left side as shown in FIG. 2. Thus, the ends 80 and 82 of the piece 74 are positioned in vertically spaced relation above the crescent shaped member 72.

On each of the ends 80 and 82 of piece 74 is formed a downwardly extending dimple 84 which is generally also out of contact with the crescent shaped member 72. Extending between the ends 80 and 82 of the member 74 is a bolt 86 which is threaded into a corresponding opening in the member 32. It is to be noted that the bolt 86 extends through an enlarged hole 88 formed in the disk shaped cap 38, shown in FIG. 1, so that the cap is free for relative movement with respect to the bolt 86.

As can be seen in FIG. 1, as the lateral position sensing probe 44 and its support member 34 are moved upwardly relative to the main support member 16, the plate 74 will eventually contact the bottom of the head on the bolt 86 and cause the ends 80 and 82 to be forced downwardly to contact the plate 72. An electrical connection is provided between these plates which, through the appropriate circuitry, described below, provides an indication that the probe is in its fully retracted position and will not provide correct readings with respect to the lateral positioning of the probe. The lateral position sensing probe support member 34 and thus the probe 44 itself, is normally maintained in an extended position through action of a spring 88 which is compressed between the inner surface of the cap 14 and the upper surface of the disk shaped cap 38.

Referring again to FIG. 1, as previously mentioned, means can be provided for indicating the relative height of the robot arm which engages the top cap 14 from the external surface being examined. In this embodiment, this vertical position sensing measurement is achieved through the use of a transducer means that measures the relative position of the support member 16 to the housing 12. The inner cylindrical wall 24 is provided with a frusto-conically shaped surface 90 which is engaged by a pin 92 slidably received in a laterally extending hole in the side of the inner wall 18 of cylindrical housing 12.

The surface 90 acts as a camming surface and the pin 92 a cam follower so that relative movement of the support member 16 within the housing 12 causes movement of the pin 92 as shown in FIG. 1 by the phantom line position. The outer end of the pin 92 engages a cantilever supported thin plate 94 which is bolted as at 96 to a portion of the inner wall 18 of the housing 12. Strain gages 96 are mounted to the plate 94 and provide an indication of the amount of stress on the plate 94 as it is bent by movement of pin 92, which stress can be easily calibrated to indicate the relative positions between the support member 16 and housing 12. This information can then easily be transformed into an indication of the distance from the surface being examined to the robot arm engaging the outer surface of the top cap 14.

A spring 98 at its lower end engages a lower lip 100 of support member 16 and at its upper end is fitted in a recess 102 formed in housing 12 to normally bias the support member 16 outwardly with respect to the housing 12. This spring is easily overcome and the deflection is indicated through the strain gages 98 upon bending of the plate 94 as a result of that movement.

The relative perpendicularity or angularity of the device with respect to an external surface is provided by the mechanism housed in and supported by the lower end cap 22 of the main support member 16. In this embodiment, a pair of angular position sensing probes 104 and 106 (see FIG. 5) are mounted in corresponding holes in the cap 22. The holes permit a slip fit of the cylindrically formed probes 104, 106. The probes 104 and 106 have spherically shaped ends and a stop ring 108 is provided on the upper end of each to prevent the probes from passing through the opening in cap 22.

The transducer means associated with each of the probes 104 and 106 is essentially the same in function as that described above with respect to the vertical position indication. However, in this case the shape of the transducer means is somewhat different in that a twin cantilevered beam member 110, as shown in FIG. 5, is provided which has two independently operable thin plates 112 and 114 associated, respectively, with pins 104 and 106. Each of the beams is integrally formed with the mounting member 116 and each extends in cantilever fashion towards the respective pins 104 and 106. Each of the plates 112 and 114 could be independently mounted if desired, however, the construction disclosed as preferred. Mounted on the surface of each of the plates 112 and 114 are pairs of strain gages 118 which provide the desired information with respect to the flexing of these members upon movement of the pins 104 and 106.

Also mounted in the bottom cap 22 in the same manner as pins 104 and 106 is a reference probe 120. Reference probe 120 is provided with a stop ring 122 which prevents the probe from passing through the associated hole in the bottom cap 22 and which also acts as a support for a biasing spring 124 which is compressed between the stop ring 122 and a recess formed in the lip of the support member 16.

This spring 124 maintains the reference pin in an extended position with respect to the bottom cap 22 and is only overcome by an exceptional force so as to prevent damage to the reference probe if the sensing device 10 is too firmly pressed against the external surface being examined. The spring 124 is therefore stronger than either spring 98 or 88 so that it is the last to compress when an exceptional force is applied to the device.

Although the device would be totally operable with the sensing probes 104 and 106 and reference probe 120 extending from the base cap 22 to engage an external surface being examined, an additional platten 126 is utilized in this preferred embodiment. Platten 126 is generally in the form of a cylindrical end cap with a cylindrical wall 128 which encompasses a corresponding portion of the end cap 22, but is of larger diameter to provide a space between the platten 126 and end cap 22 for freedom of relative movement therebetween. The bottom 130 of platten 126 is of an annular form with a central opening 132 through which the probe 46 extends. An annular hardened insert 134 is bolted through a plurality of screws 136 to the bottom 130 to provide a more wear-resistant surface since it is anticipated that the rest of the platten is preferably formed of aluminum or other softer material.

Cylindrical holes 138 are formed in the softer material in the bottom 130 to permit each of the probes 104, 106 and 120 to rest on the harder annular insert 134. This upper surface of the annular insert 134 thus becomes the external surface being examined by the probe and the opposite parallel surface of the annular insert 134 will engage the surface of the workpiece actually being examined. Sufficient freedom of angular movement between the platten 126 and end cap 22 is provided by the clearance between the walls in order to permit a desired maximum angle of tilt of the sensing device 10 with respect to the workpiece being examined.

The platten 126 is held in position against the reference probe 120 through the use of a pin 140 fitted in a corresponding hole in cap 22 and extending into a slot 142 formed in the upstanding wall 128 of the platten 126. A spring 144 biases the platten 126 away from the end cap 22.

Figure 6:
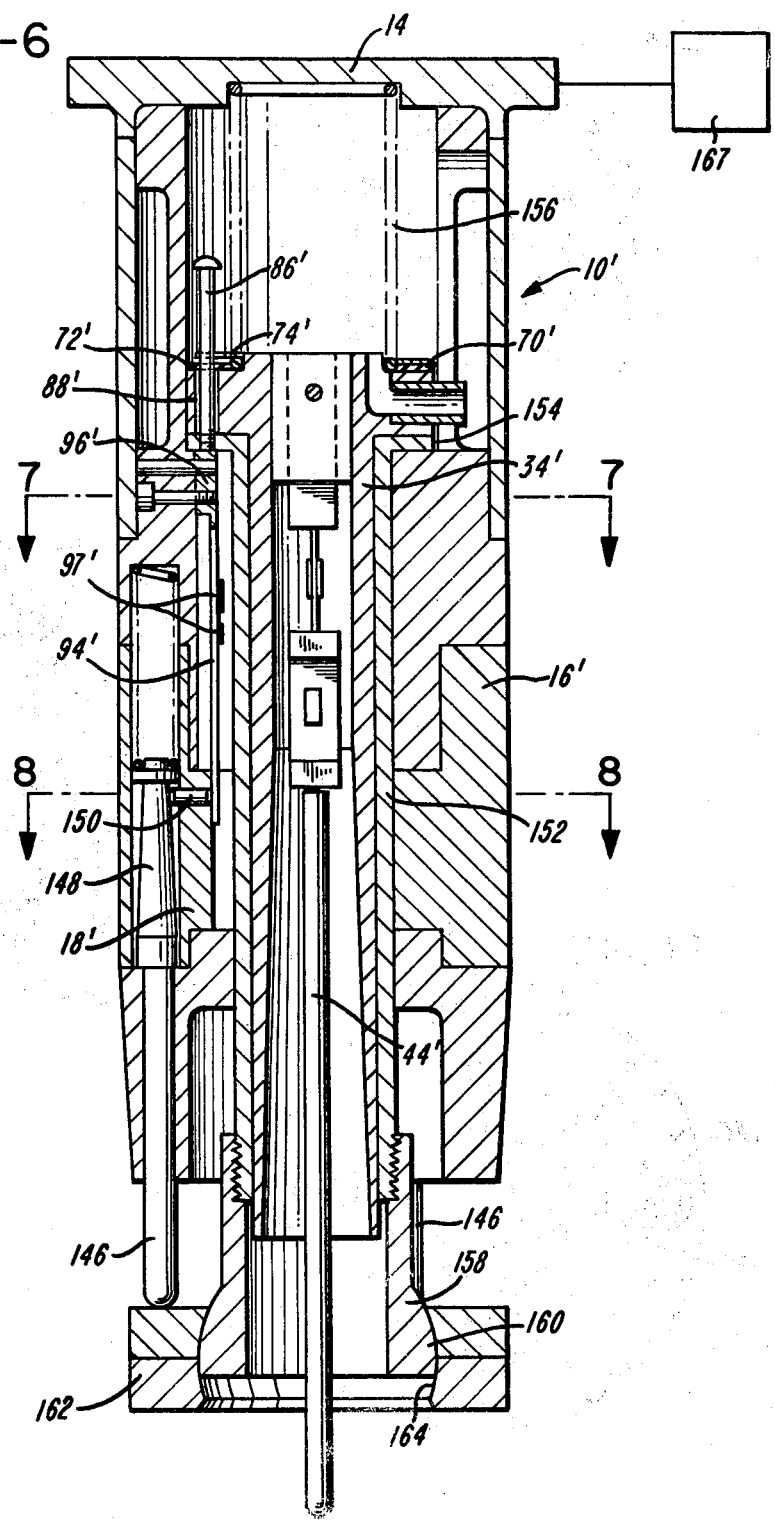
FIG. 6 is a cross sectional view of an alternative preferred embodiment of the present invention.
Figure 7:
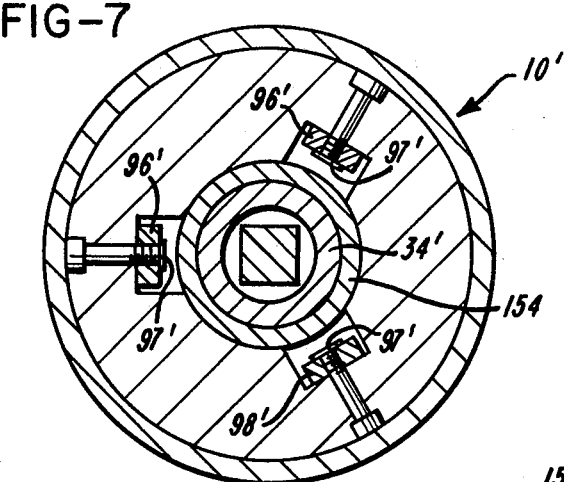
FIG. 7 is a cross sectional view along line 7—7 of FIG. 6.
Figure 8:
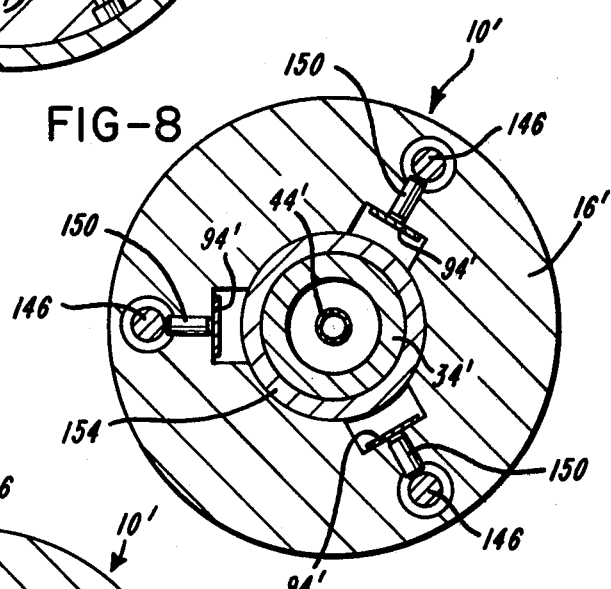
FIG. 8 is a cross sectional view along line 8—8 of FIG. 6.

A second embodiment of the invention is illustrated in FIGS. 6 through 8. This embodiment is very similar to that of the above-described embodiment. It is provided with a main support member 16' which is likewise formed of a plurality of components for ease of assembly and construction. A most noteworthy difference between the embodiments of FIGS. 1 and 6 is that the sensing device 10' of FIG. 6 is not provided with a telescoping housing 12 in which the main support member 16 is received. In view of this, some means must be provided for absorbing the height changes between the robot arm which is fastened to the top cap 14' and the external surface to be examined.

In this embodiment, this height adjustment is achieved through the plurality of sensing probes 146 which are somewhat different in construction from the sensing probes 104 and 106 of the embodiment of FIG. 1. Also, in this embodiment, there is no reference probe 120. In this embodiment the measurement of the height is achieved through the monitoring of the relative position of the probes 146 within the support member 16'.

Each of the sensing probes 146 has an upper frusto-conically shaped portion 148 which provides a tapered camming surface for pin 150 which functions as a cam follower and is loosely fitted in a hole in the inner wall 18' of the support member 16'. This pin 150 in turn engages the thin plate 94' which extends as a cantilever beam from the mounting member 96' secured to the support member 16'. Strain gages 98' sense the stressing of plate 94' due to movement of the sensing probe 146 and thus provide an indication of the relative position of the sensing probes within the main support member 16'.

The lateral position sensing probe 44' is identical to that of the first embodiment and the lateral position sensing probe support member 34' is very similar to that of the first embodiment, described above. Any difference in construction of these elements is due to the difference in the general shape of the overall sensing device 10', while the functions are identical.

Surrounding the support member 34' is a cylindrical sleeve 152 which is provided with an upper annular flange 154. This sleeve 152 is slidingly received in a corresponding bore through the support member 16'. Both the lateral position sensing probe support member 34' and the sleeve 154 are biased outwardly from the main support member 16' by spring 156 acting between the top cap 14' and the upper surface of support member 34'. It is noted that thus the support member 34' is free for sliding movement within the sleeve 152 and the sleeve 152 is in turn free to slide within the corresponding bore in support member 16' against the biasing force of spring 156. This permits the lateral position sensing probe 44' to telescope into the device 10', independently of movement of the sleeve 152.

The lower end of sleeve 152 threadably receives a generally cylindrical platten support member 158. The lower portion 160 of member 158 is spherically shaped and supports a platten 162 having a correspondingly shaped central opening 164 therein which is free for pivotal movement on the spherically shaped lower portion 160 of the member 158. The platten 162 is formed in two pieces and then bolted together on the lower end of the member 158 and is thus held in position.

Each of the probes 146 contacts the upper surface of the platten 162 and the bottom surface of the platten 162 is then used to contact the workpiece being examined in essentially the same way as the first disclosed embodiment above. The member 158 has a cylindrical central opening through which the probe 44' extends. The platten 162 is free to rotate on the member 158 as it engages the workpiece being examined and, as a result, moves the probes 146 to provide the indication of the relative angularity or perpendicularity between the sensing device 10' and the surface of the workpiece.

Figure 9:
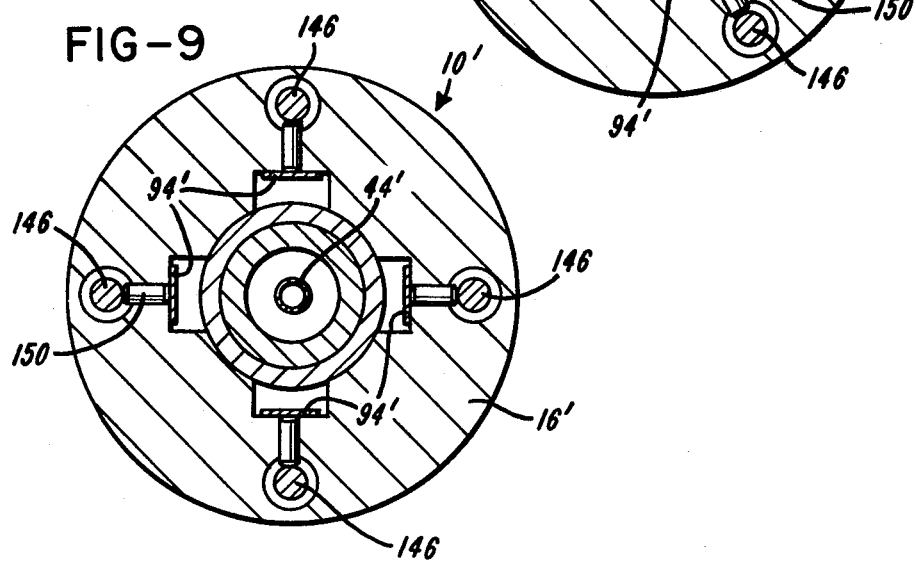
FIG. 9 is a cross sectional view along line 8—8 of FIG. 6 of an additional alternative embodiment in which there are four sensing probes rather than three.

Although three probes are illustrated in the embodiment of FIGS. 6 through 8, one or more probes may be utilized, for example, as is illustrated in a slight modification of FIG. 9 where four sensing probes 146 are illustrated in cross section taken through the same line as section 8—8 of FIG. 6. With the exception of the difference in the numbers of probes, the device 10' is identically constructed to that as illustrated in FIGS. 6 through 8.

It is also contemplated that a single probe may be used to achieve the desired results. If, for example, looking at the device illustrated in FIG. 6 only the single probe shown in the cross section of the drawing were present and neither of the other two probes shown in cross sections of FIGS. 7 and 8 were present, this device could still be utilized to provide the desired information. All that is necessary is a means 167 illustrated schematically in FIG. 6 as a box, which is capable of rotating the device 10' about its central axis and including means for receiving signals from the single probe at different positions as it is rotated around that axis while in contact with the target surface. The necessary information can thus be obtained from a single probe moved to multiple positions, as opposed to multiple probes in fixed positions. Information from the probe need only be obtained at two separate locations 90 degrees apart, in order to establish the angle of the axis of the device to the target surface, although multiple data points could also be used. This could be achieved very easily in many existing industrial robots since a typical movement provided in the wrist portion of the robot arm is the ability to rotate while knowing the exact position of the "hand" which would be holding the sensing device.

As previously mentioned the sleeve 152 is free for independent relative movement with respect to the lateral position sensing probe support member 34'. Thus, as with the first embodiment, in order to indicate that the lateral position sensing probe 44' is not providing accurate information when fully retracted within the platten 162, an annular plate 70' is mounted to the upper portion of the support member 34' and supports the crescent shaped conductive piece 72'. A horseshoe shaped conductive piece 74', bent in the same manner as the piece 74 described above, is mounted to the member 70' and extends over the member 72'. A bolt 86' is threaded into the flange 154 of support member 34' and extends through an enlarged bore 88' in the upper portion of the support member 34'.

Figure 10:
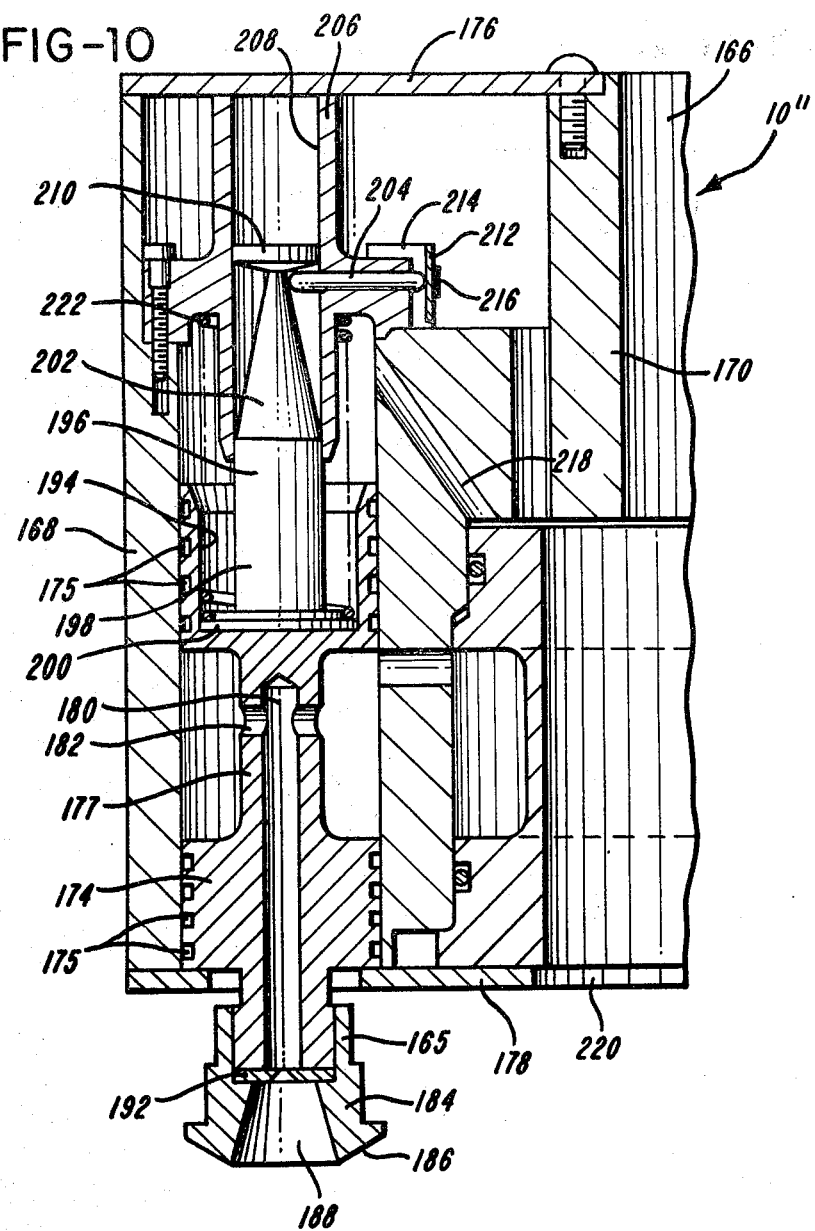
FIG. 10 is a fragmented cross sectional view of a further preferred embodiment of the present invention.

Yet another embodiment is illustrated in FIG. 10. This embodiment of the position sensing probe 10" is somewhat more specialized in that it is designed to allow each of the angular position sensing probes 165 to measure the relative angularity between the position sensing device 10" and an external surface through a hydrodynamic bearing principal in which the liquid separates the sensing probes 165 from the external surface being examined. This device is useful in those instances where it is desirable to avoid actual contact between the workpiece and the sensing probes 165. One such use is wherein a sonic sensor is utilized in a liquid environment to examine the surface of a workpiece and wherein it is desirable to know the perpendicularity or angularity of the sensor with respect to that surface. The use of the fluid bearings to support each of the sensing probes 165 is beneficial in such an environment.

Referring to the details of the embodiment of FIG. 10, the actual sonic sensor (not shown) is itself not important to the present invention and is merely secured within a central cylindrical opening 166 defined in the main body of the sensor 10" and which is equivalent to the support member 34 in the initially described embodiment. This main body or support member includes an outer cylindrical wall 168 and inner cylindrical offset wall 170 composed of two generally cylindrical portions 172 and 173 which define a plurality of fluid channels discussed below. A top annular plate 176 and a bottom annular plate 178 cover the top and bottom of the device with exception of the central bore 166 through which the sonic sensor extends.

What is shown in FIG. 10 is essentially a single quadrant of the device and it is anticipated that in this embodiment there will be four sensing probes 170, although another number of probes could be utilized in accordance with the present invention.

Referring now to the construction of each of the probes 165, the main body 174 is cylindrical and is slidingly received in a corresponding bore formed in the outer wall 168 of the device. A plurality of combined labyrinth seals and dirt grooves 175 are formed in the upper and lower regions of the main body 174 to assist in maintaining smooth sliding movement of the main body within its bore. In the central region of the main body 174 is a reduced diameter cylindrical portion 177 which thus provides an annular cavity surrounding the main body 174 within the bore formed in the outer wall 168. A central vertically extending bore 180 extends from this central region 178 and opens at the lower end of the main body portion 174. A lateral bore 182 extends through the central portion 178 and intersects the vertical bore 180.

On the lower end of the main body 174 is secured a probe tip 184 of generally cylindrical construction with an upwardly top area conical portion 186 around the lower edge thereof to assist in fluid flow away from the probe tip 184. In the center of the probe tip 184 is a frusto-conically shaped cavity 188 which communicates with the bore 180 through opening 190 in the probe tip. Between the outer end of the main body 174 and the opening 190 in the probe tip is a metering orifice plate 192. This metering orifice plate 192 is very important in the present embodiment in that it determines the amount of fluid separation between the working surface being examined and the lower surface of the probe tip 184. The means for determining the size of this orifice are described more fully below. The height of the water film can be described by the equation:

$$h = \tfrac{1}{4} d_0^2/d_v (K_0/K_p)(\Delta P_0/\Delta P_v)^{\tfrac{1}{2}}$$

where:

| | |
|---|---|
| $h$ = | the desired thickness of the water film |
| $d_0$ = | the diameter of the orifice |
| $d_v$ = | the diameter of the probe tip |
| $\Delta P_0$ = | the pressure drop across the orifice |
| $\Delta P_v$ = | the pressure drop across the probe tip |

-continued $K_O$ = the orifice flow coefficient
$K_v$ = the probe flow coefficient where the coefficients $K_O$ and $K_v$ are derived experimentally.
And $$d_v = 2(F/\pi \Delta P_v)^{\frac{1}{2}}$$

where
F = spring force
If the spring force is given and, by design, $\Delta P_O = \Delta P_v$ and the maximum operating presure of the system is given equal to $\Delta P_t$ then:

$$\Delta P_t = 2\Delta P_v = 2\Delta P_O$$

therefore:

$$\Delta P_v = \Delta P_t/2$$

therefore:

$$d_v = 2(2F/\pi \Delta P_t)^{\frac{1}{2}} = C$$

and since $$\Delta P_O = \Delta P_v$$

$$h = \tfrac{1}{4} d_O^2/d_v (K_O/K_p)$$

and therefore $$d_O = (4hd_v(K_O/K_p))^{178}$$

therefore $$d_O = C'(h)^{\frac{1}{2}}$$

where $$C' = (4d_v(K_p/K_O))^{\frac{1}{2}}$$

Thus, once the desired h, $\Delta P_t$, and F are chosen by design, $d_O$ is easily calculated and h at any other $$\Delta P_O = C''(\Delta P_O/2)^{\frac{1}{2}}$$

where $$C'' = \tfrac{1}{4}(d_O^2/d_v)(K_O/K_p)/(\Delta P_t/2)^{\frac{1}{2}}$$

Referring now to the upper regions of the main body 174 of the probe 165, a central cylindrical cavity 194 is defined in the upper region of the main body 174 and receives a camming member 196 in the cavity 194 of the main body 174. The camming member 196 includes a cylindrical portion 198 which has a stepped flange 200 at the lower end thereof and a camming surface 202 of frusto-conical shape at the upper end thereof.

As with the previously described embodiments, this frusto-conically shaped camming surface is engaged by a pin 204 forming a cam follower and which is mounted with a sliding fit in an opening in a portion of the main body of the sensing device 10″. In this case the pin 204 is fitted in a guide member 206 mounted to the outer wall 168. The guide member 206 defines a cylindrical bore 208 which telescopically receives the camming member 196. At the upper end of the frusto-conically shaped camming surface 202 is a cylindrical cap 210 which also slides within the bore 208 to provide additional stability for the cam. Note, the camming member 196 and body 174 are not connected.

Pin 204 in turn engages a thin plate 212 which is cantilever mounted through the mounting member 214 to the main body of the sensing probe 10″. Strain gage transducers 216 are secured to the cantilever mounted thin plate 212 to sense its movement and thus provide an indication of the movement of the probe 165 relative to the main body of the sensing device.

Although it is possible to make the device 10″ completely fluid tight to external fluids in the environment in which it is intended to operate, the present embodiment is not so designed. In view of the fact that liquid can pass along the outer surface of the probe 165 and upwards into the cavity in the main body housing the probe, an additional liquid bleed off cavity 218 is provided in the inner wall of the main body of the device in order to permit fluid which passes into the bore surrounding the camming member 196 to pass out through this cavity and empty out of the device through the opening 220 in the lower portion thereof. This bleed cavity 218 thus prevents a build up of back pressure above the probe which would inhibit its operation.

Referring again to the probe 165, the probe is biased outwardly from the device by spring 222 which extends between the stepped flange 200 and a corresponding annular cavity defined in the lower region of the guide member 206. The force applied by this spring 222 is important with respect to the design of the orifice 192 since maintenance of the liquid bearing between the probe tip 184 and the surface being investigated depends on the ability of the liquid pressure to overcome the spring pressure as the device is lowered onto the surface being investigated. Obviously, the force applied by the spring will vary as it is compressed or extended upon movement of probe 165 relative to the main body of the device.

It is to be noted that the construction of FIG. 10 could be combined with a construction similar to FIG. 1 with the use of a reference probe, but without the additional platten of the embodiment of FIG. 1.

Figure 11:
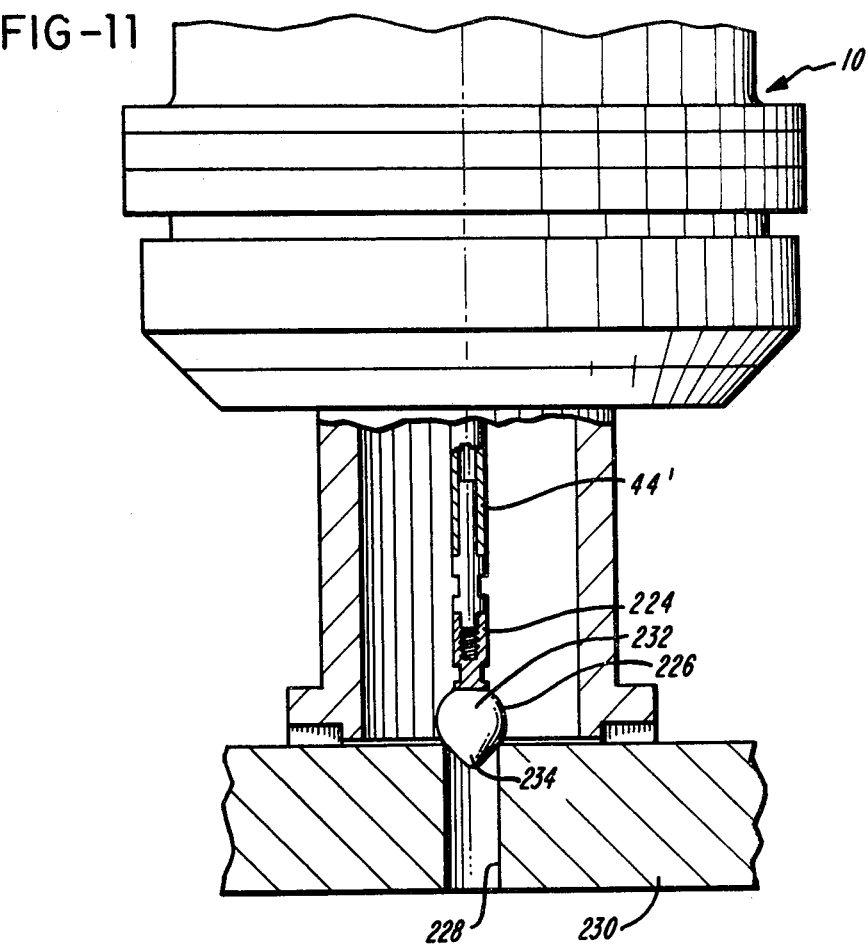
FIG. 11 is a further fragmented partially cross sectioned view of an additional embodiment of a lateral position sensing probe engaged in an opening in an external surface.
Figure 12C:
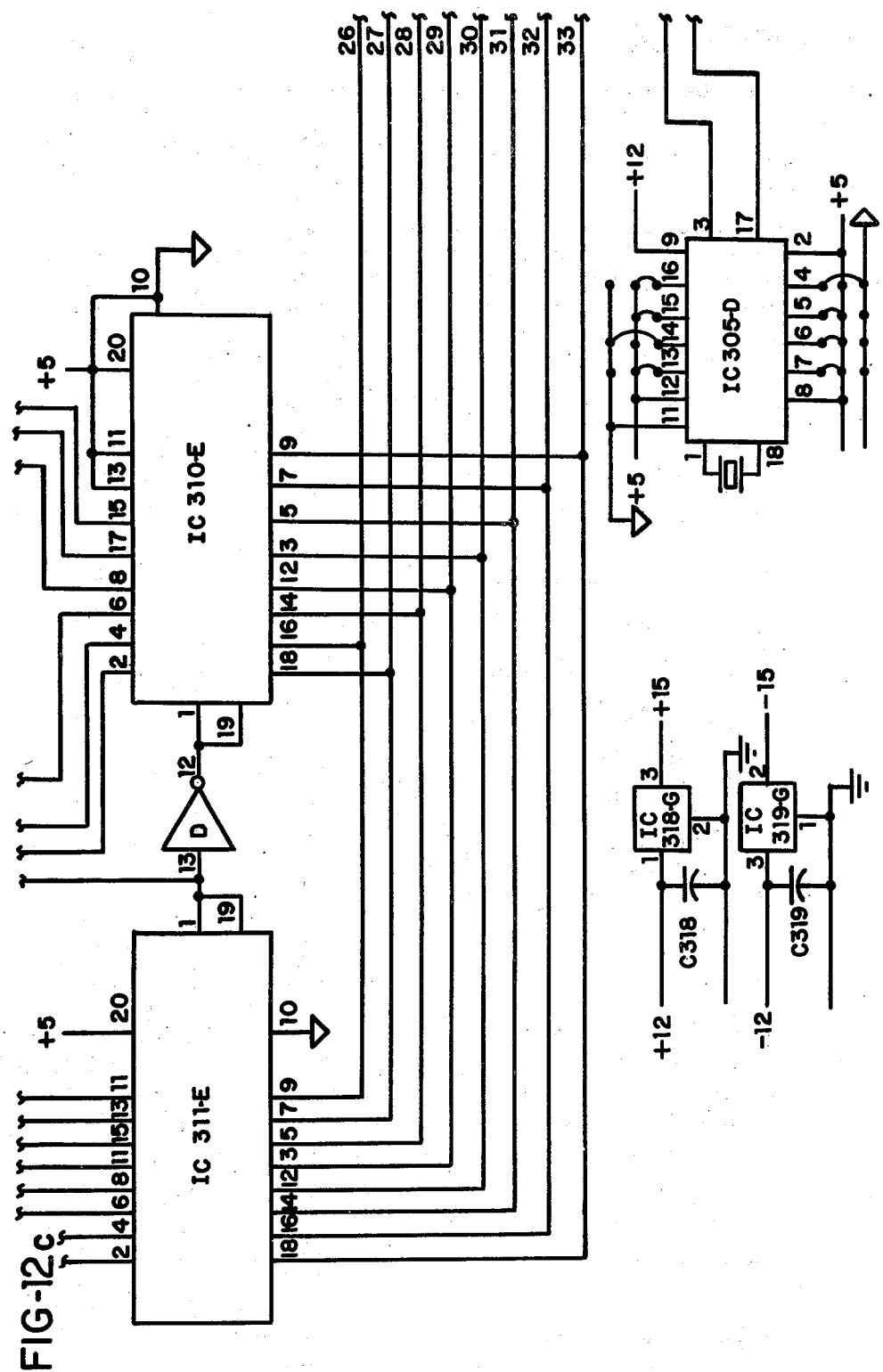
FIGS. 12a–21 illustrate the circuitry which utilizes the signals from the various transducers in the embodiment of FIG. 1 to provide a visual indication of the relative position between the support member and the external surface being sensed.
Figure 12D:
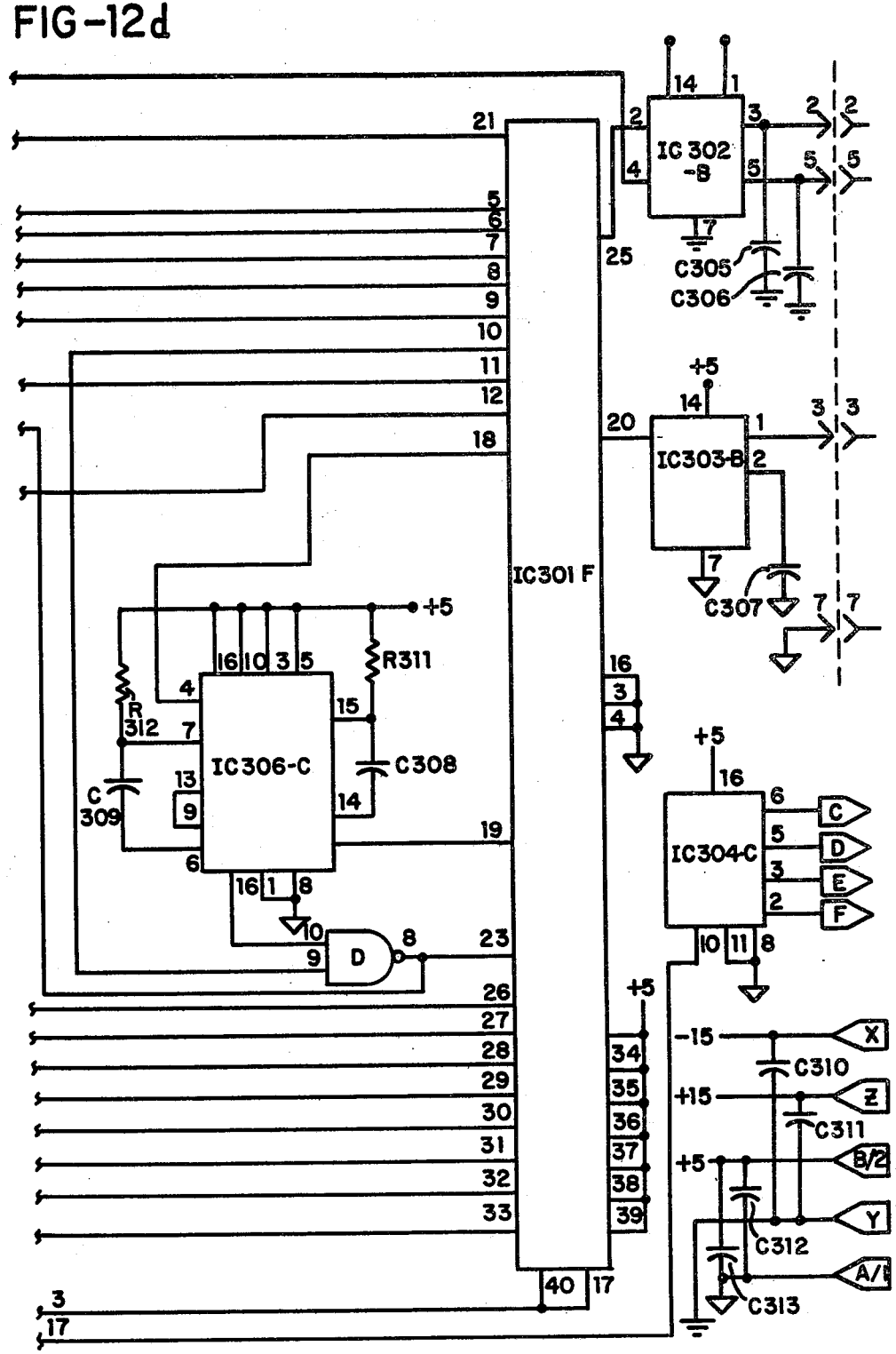

Referring now to the further embodiment disclosed in FIG. 11, this is essentially the embodiment of FIG. 1 with an adaptation of the lateral position sensing probe 44. In this embodiment, the lateral position sensing probe 44′ is provided with an extension 224 at the lower end of which is a probe centering tip 226. The purpose of this tip 226 is to aid in locating the exact center of an existing hole such as hole 228 in an exemplary workpiece 230.

The tip 226 consists of a spherical upper portion 232 which blends into a conically shaped lower portion 234 with a radiused lower end. With this construction, as the probe approaches the hole 228 from the side, the conically shaped lower portion 234 first reaches the edge of the hole and the tip 226 is immediately centered in the hole through the force of spring 88 and the bending of the probe 44′. Bending of the probe 44′ causes the strain gages 66 and 68 to transmit the necessary electrical signals to indicate the necessary direction of movement of the device 10 to center it over the hole 228. Likewise, if the device 10 is moved laterally away from the hole the spherical design in conjunction with the conical tip assist in permitting the probe 226 to easily lift out of the hole 228 without causing damage to the lateral position sensing probe.

Although the above described embodiments of the present invention were designed mainly to establish perepndicularity between the device and the target surface, it is to be understood that it is considered an additional feature of the device to be able to sense an angular relationship between the device and the target surface in a manner as disclosed in the above referred to related applications. Likewise, it is considered that the ability to sense perpendicularity or angularity of the device relative to the target surface is independent of the function of the lateral position sensing probe utilized in the preferred embodiment. These features combined, however, provide the desired sensitivity for the environment in which this device is described above.

The circuitry of FIGS. 12a–21 is specifically designed for utilization in connection with the embodiment of FIG. 1, but is easily adaptable for use with the other embodiments described above. Therefore, only the circuity will be described to indicate how the various strain gage transducer outputs are utilized to provide indications of the perpendicularlity or angularity of the device with respect to an external surface, the relative closeness of the device to that surface and the position of the lateral position sensing probe relative to a discontinuity in that surface.

When the device 10 is assembled, an arbitrary X and Y axis is established which, as the device is viewed in FIG. 1, the X axis lies in the plane of the paper and the Y axis perpendicular to the paper. Information with respect to the movement of the lateral position sensing probe 44 in the X axis is provided by strain gage transducers 66 while information with respect to movement of the probe in the Y axis is provided by strain gage transducers 68. Strain gage transducers 66 and 68 are bonded to both sides of the flexible members with which they are associated and are interconnected to form a four active arm wheatstone bridge. The resulting differential output signal changes polarity as the probe tip is deflected through the free state, zero position. The lateral position sensing probe output signals $L_x+$ and $L_x-$ and $L_y+$ and $L_y-$ are connected to the input multiplexer on the input side of FIG. 15a.

As previously mentioned, the vertical position sensing measurement is provided through the output of the strain gage transducers 96. These strain gages are mounted to both sides of the thin flexible plate 94 and are interconnected to form a complete four active arm wheatstone bridge. The resulting differential output signal is designated as Vert+ and Vert– and is connected to the input multiplexer illustrated in FIG. 15a.

The relative perpendicularity or angularity of the device, as previously mentioned, is provided through the inputs of strain gages 118. Again, in initial assembly, these strain gages and the thin plates 112, 114 to which they are bonded are aligned with the selected X and Y axis which coincides with that described above in connection with the lateral position sensing probe 44. Again, the strain gages are bonded to both sides of each of the thin plates and are interconnected to form a separate four active arm bridge on each plate 112, 114. The resulting differential electric signals are designated Pin 1– and Pin 1– and Pin 2– and Pin 2– and are connected to the input multiplexer on the input circuity illustrated in FIG. 15a.

The two sensing probes 104 and 106 are positioned equidistant from the +X axis at a specific distance from the Z axis extending upwardly alongside the lateral position sensing probe 44 and which is the central axis of the device 10. The reference probe 120 is positioned on the –X axis at a distance from the Z axis equal to the distance from the probes 104 and 106 to the Z axis. As previously mentioned all three of the probes contact the platten.

The two sensing probes 104 and 106 are, as shown, longer than the reference probe 120. When the device 10 is aligned exactly perpendicular with the target surface, the two sensing probes 104, 106 will be depressed to the same relative length as the reference probe 120, causing the thin plates to be deflected to about half of their intended deflection over the full measuring range of the device.

When the sensing device 10 is tilted in the plane passing through the X axis, the two plates will be deflected in exactly the same manner thus creating output signals from the transducers that are equal in polarity and magnitude. When the position sensing device is tilted in the plane passing through the Y axis, the thin plates will be deflected in equal but opposite directions, causing a proportional change in the output signals from the strain gages. This reversal and change in magnitude of one signal relative to the other is electronically differentiated from the condition when both signals vary in the same manner to generate the processed signals that define the perpendicularity of the sensor head relative to the target surface. The same differential can be utilized through proper integration to provide an indication of the exact angle of the position sensing device relative to the surface and in an azimuth plane.

Referring now more specifically to FIGS. 15a–d which constitute the input circuitry of the device from the various strain gages, fixed and variable voltages are developed from onboard regulators in this circuitry to excite and calibrate each of the strain gages utilized as input. The individual bridge output signals are multiplexed, amplified, demultiplexed, and stored on sample and holds and then analog processed to yield the desired X and Y axis perpendicularity, horizontal position and vertical height outputs. These signals are then scaled to true engineering units, buffered and output to the user at the analog output connector and placed on the system buss for use by the associated sensing device circuits described below.

As previously stated, the two perpendicularity sensors Pin 1 and Pin 2, the horizontal X and Y probe sensors and the vertical sensor are connected to the four channel differential multiplexers IC101 and IC102. An "opposite polarity" Pin 2 signal is also created by reversing the polarity of Pin 2 signal and feeding it to channel 6 on differential multiplexer IC101. Precision voltage reference IC111 and resistors 117 and 119 and potentiometer R118, form a bridge emulation circuit that creates a high common mode, low differential voltage that is adjusted to be equal to the full scale output of the most sensitive strain gage in the sensing device 10. This signal is input to channel 7. Channel 8 is grounded.

All the strain gage bridge sensors, except the perpendicularity Pin 2, are excited from the regulated output of IC112. The Pin 2 bridge is excited from the adjustable voltage regulator IC110 to provide a means of adjusting the gain of the Pin 2 bridge to exactly match that of the Pin 1 bridge. Resistors R101 through R115 establish a small potential across the potentiometers R106 through R110 which is used to adjust the output of each bridge to zero.

The eight data channels of the two multiplexers are sequentially addressed by the system clock inputs B through D. Clock B is coupled directly to the "enable" or "select" Pin 6 of multiplexer IC102 and through inverter section A of IC104 to the same Pin on multiplexer IC101. When Clock B is at a logic high, multiplexer IC101 is selected and multiplexer IC102 is tristated or disconnected and vice versa. Clocks C and D are decoded to select one of the four channels of data presented to each multiplexer.

The differential outputs of the two multiplexers are connected to a high speed instrumentation amplifier IC103 that amplifies the small differential voltage from the selected bridge to a usable signal level while rejecting the common mode DC bridge voltage and any common mode noise signals that are induced in the interconnecting cables, etc. This high level signal is then routed through demultiplexer IC105 which switches the output to the selected sample and hold capacitor C113 through C120 as determined by the address generated by the system clock signals B, C and D. Clock A is inverted through section B of IC104 and used to enable the demultiplexer output after the amplifier has settled or stabilized to the new level, thus charging the selected capacitor to the signal level.

Unity gain buffer amplifiers section A, B and C of IC114, section B of IC108 and sections B and C of IC109, provide a very high impedance load to the sample and hold capacitors to provide any bleed down of the analog signal level stored in each capacitor. The two perpendicularity signals on capacitor C113 and C114 are summed with an offset voltage with potentiometer 130 in the chopper stabilized, low drift amplifier IC106. The series resistance of potentiometer R133 and resistor R134 is adjusted to exactly match the resistor R132 so that both signals provide exactly the same output when the signal levels are exactly the same. Potentiometer R130 is adjusted to reduce the output of amplifier IC106 to zero when the perpendicularity signals are at one half of their full scale output. This condition occurs when the sensing probe 10 is perpendicular to the target surface in the plane containing the X axis.

When the position sensing device 10 is inclined in only the plane containing the X axis, the signal levels on both C113 and C114 increase or decrease in equal amount causing the output of amplifier 106 to increase above or below zero to indicate the magnitude and direction of inclination of the main body of the position sensing device in the plane of the X axis.

When the position sensing device 10 is inclined in the plane of the Y axis, the voltages on capacitors C113 and 114 vary in equal and opposite directions, resulting in no change in the output of amplifier IC106. Potentiometer R139 and resistor R138 establish the gain of amplifier IC106. Capacitors C121 and C122 are used by amplifier IC106's chopper stabilization system. Capacitor C123 limits the band pass of the amplifier to minimize noise feed through. The processed signal from IC106 is scaled to true engineering units with potentiometer R142, buffered with unity gain amplifier IC114, section A and routed through the analog output on the connector of the control unit (not shown).

The voltage on capacitor C113 is also summed with the voltage on C115 in amplifier IC107. This amplifier circuit is the same as the previously described example using amplifier IC106, except no offset is summed with the voltages stored on the capacitors. The voltage on C115 is the same magnitude, but now opposite in polarity, to the voltage on C114 so now the voltages on C113 and C115 cancel each other when they are summed together.

Since these two signals are always equal in magnitude but opposite in polarity for any inclination of the sensing device 10 in the plane containing the X axis, the output of amplifier IC107 remains unchanged. When the position sensing device is inclined in the plane containing the Y axis, the voltages now become equal in magnitude and polarity and sum to produce an output which changes in polarity as the angle of inclination in the plane containing the Y axis passes through the zero or true perpendicularity position.

The amplifier IC107 output is buffered and output by amplifier IC108, section A in the same manner as the previous example using amplifier IC114 section A.

The two horizontal position signals stored on capacitors C116 and C117 and the vertical height signals stored on capacitors C116 are buffered by amplifiers IC109 sections B and C and IC108 section B, respectively, scaled with potentiometers R114 through R146 and buffered with amplifiers IC109 section B and D and IC108 section C, as in the previous examples. The scaled vertical output is again buffered with amplifier IC108 section D and rescaled with potentiometer IC147 for use by the digital voltmeter in the visual display circuitry described below. Remaining capacitors are provided to bypass low and high frequency noise to and from the system buss power supply feeds of FIG. 17.

Figure 13A:
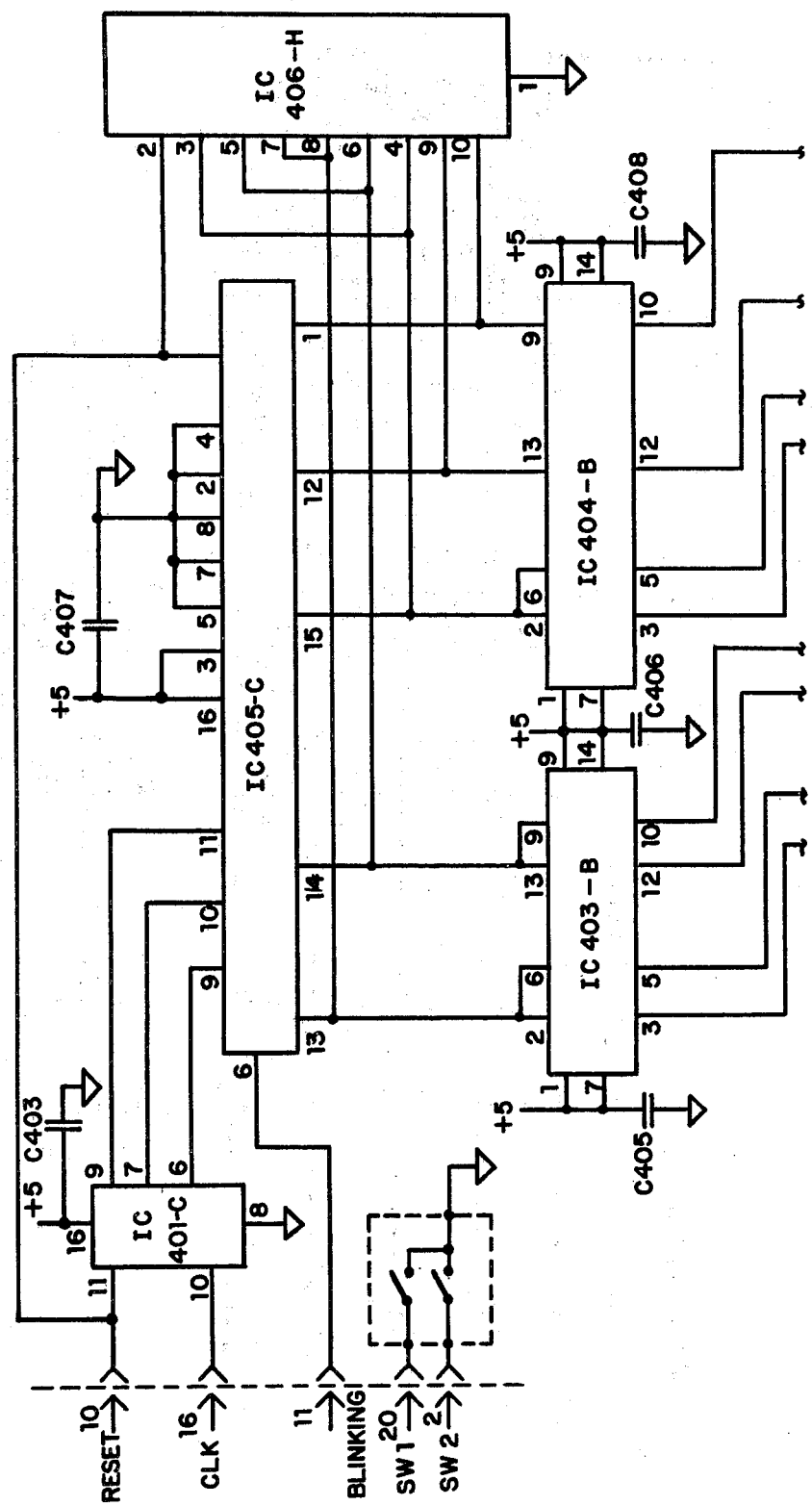
Figure 13C:
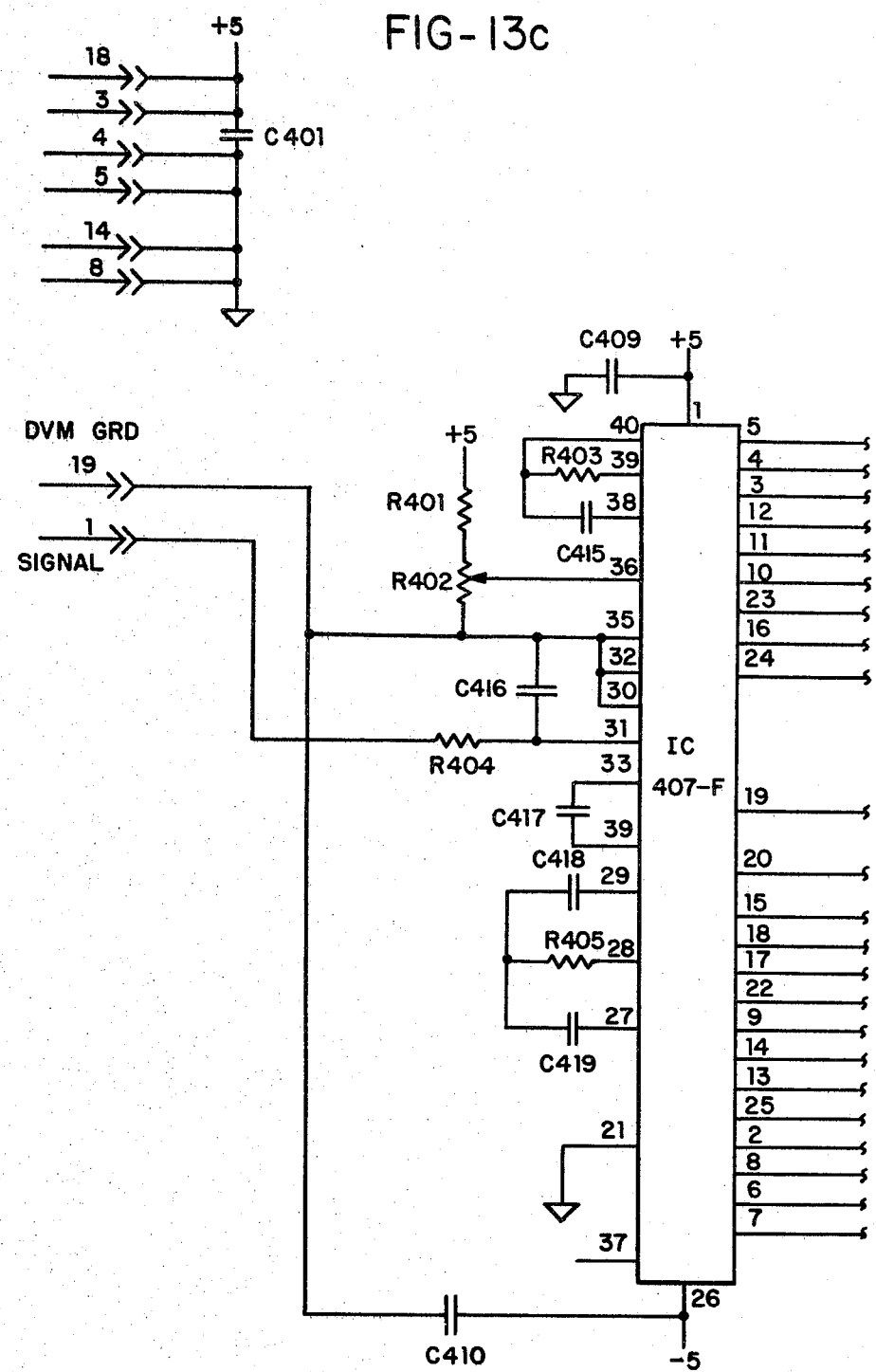
Figure 13D:
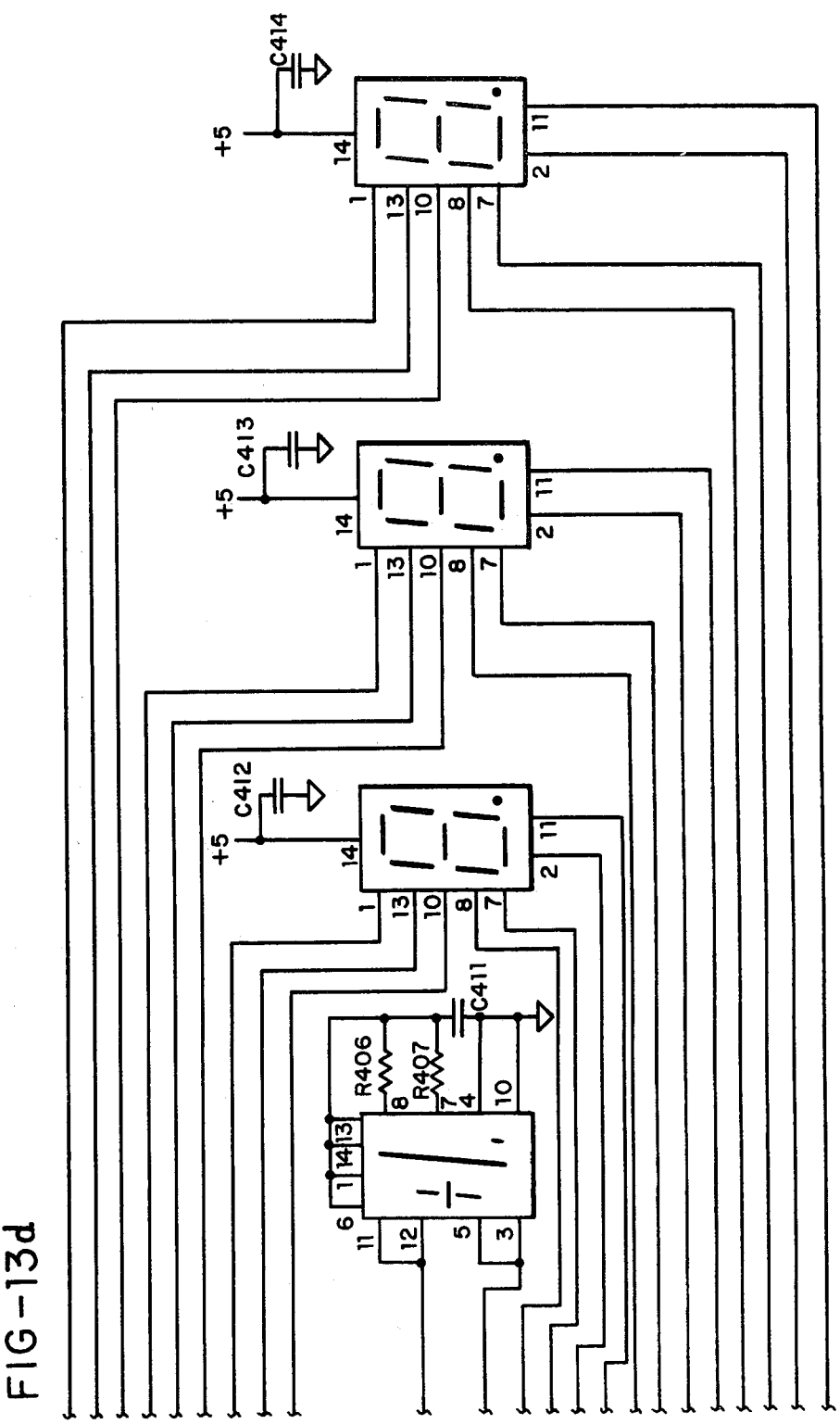
Figure 22:
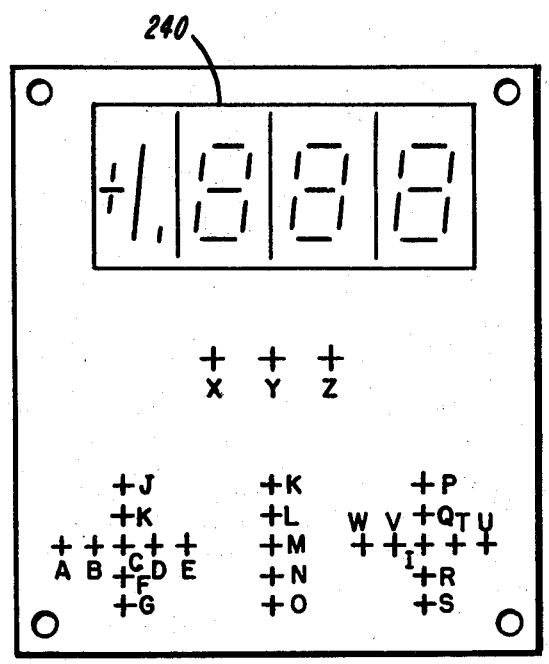
FIG. 22 is a plan view of a panel indicating a possible array for the light signals produced through the circuitry of FIGS. 12a–21 which indicates movement of the position sensing device.

A visual display for the operator controlling movement of the position sensing device is provided in a format illustrated in FIG. 22 where each of the lettered positions indicates a visible LED lamp. In addition, a digital display 240 is provided which indicates the vertical height of the position sensing device relative to the external surface being examined. The circuitry for driving this display board of FIG. 22 is illustrated in FIGS. 13a-d. The LED displays in the visual display are arranged in a five column, six row matrix as illustrated in FIG. 13b. Each column corresponds to a specific horizontal/vertical position or perpendicularity axis in the visual display as indicated in FIG. 22. The columns are connected to power at the same time the axis signal is connected to the LED driver. The output of the LED driver then selects the appropriate LED in the row and the LED lights for a brief period equal to 20 percent of the time for one cycle through all the columns.

The sensitivity LED indicators are selected by the sensitivity switch and the center green LED indicators in each axis are multiplexed in with a display LED in the first three rows. A completely separate 3½ digit digital voltmeter chip creates a digital display of the vertical position of the sensor in true engineering units on the digital display indicator 240.

Referring now to the specifics of this circuitry, IC407 is an LSI integrated circuit containing a complete dual slope 3½ digit digital voltmeter that directly drives the seven segment LED numerical displays 240. The resistors and capacitors connected to this circuit are specified by the manufacturer and provide a scaling and internal clock timing functions. Resistor 401 and potentiometer R402 set the zero point of the display.

The system signal clocks ripple counter IC401 which generates a three line address for a multiplexer IC405. The counter sequentially generates six unique addresses. The first five addresses connect the voltage to the selected input of IC403 or IC404. The sixth address connects the same voltage to the reset input of the ripple counters in the visual display and the display driver board, resetting all counters and resynchronizing the ripple counter in the visual display to the ripple counter on the display driver board. Both counters will then generate a synchronous address relating to a column in the LED matrix to one of the five sensor axis signals.

IC403 and IC404 are switching transistors arrays which switch power to the selected row of display LED's when the switches are turned on by the signals from the multiplexer IC405. IC402 is a buffer-sinker which connects the cathode of the selected LED in each row to ground in response to the output of the LED driver on the display driver board. Display LED's I, C and N are the green center LED's which are simply sequentially turned on during the first three change of addresses to the multiplexer IC405. They appear to be on continuously because the human eye integrates the pulsed light source and sees only the average illumination and intensity. The cathodes of these LED's are tied in common to ground through IC402.

LED's X, Y and Z are the sensitivity indicators. A separate input to IC402 is driven low at the right time by the logic on the display board to cause the LED related to the specific position of the sensitivity switch to turn on. The jumper shown on Pin 19 of IC402 is strapped to the power supply or ground depending on the choice of one of two different integrated circuits that can be utilized for IC402.

Referring now to the display driver circuitry of FIGS. 14a-e, as previously mentioned, the X and Y axes perpendicularity and horizontal position signals and the vertical position signal are scaled to the fine medium or coarse signal levels as selected by the switch in the visual display and sequentially multiplexed into an L.E.D. driver. The multiplexing logic selects one of the five scaled input signals, applies it to the L.E.D. driver and applies power to the selected axis of the visual display. The L.E.D. driver turns on the L.E.D. in the visual display that is scaled to the instantaneous polarity and magnitude of the applied signal in the selected axis. Additional logic causes all L.E.D. displays to blink at the rate of $2H_z$ when the vertical position signal is near the maximum positive level. This indicates that that sensor head is not in contact with the target surface.

This logic also causes the vertical position digital display to display only a "−1." to indicate an over range condition when the vertical position signal is near the maximum negative level. This indicates that the sensor head has been collapsed to the least working height. Auxiliary logic also detects the closing of the "probe out of hole" switch that was functionally described in the "Input Board" circuit discussion. This action blanks the X and Y axis horizontal position L.E.D. displays in the visual display unit.

Looking at FIGS. 14a-e, the X and Y axis position and perpendicularity signals and the vertical position signal are individually scaled to specific fine, medium and coarse signal levels by potentiometers R201 through R205 and resistance voltage dividers R206-R208, R209-R211, R212- R214, R215-R217 and R218-R220. Scaling demultiplexers IC201, 202 and 203 select the fine, medium or coarse level of each signal as determined by the address created by the sensitivity switch in the visual display that is connected to the two address lines pulled high by resistors R221 and R222 and tied in common to all demultiplexer unit address inputs.

The lower half of demultiplexer IC203 selectively grounds one of the three inputs to multiplexer IC205 to indicate which sensitivity range has been selected. Resistors R223 through R225 pull the inputs to IC205 to a logic high when they are not selected. The five individually scaled output signals are multiplexed to the L.E.D. driver IC208 by multiplexer IC204. The multiplexer address to IC204 and IC205 is created by ripple counter IC206 which receives clock pulses from the system buss through inverter section E of IC211. This clock signal is also output to the visual display through connector 202.

The ripple counter continually counts to five and is then reset by another counter in the visual display. This reset action is explained in detail in the description of the visual display above. The five counts create five unique address outputs which select the five signal channels in a specific sequence.

The L.E.D. driver IC208 is essentially a set of 10 precision comparators. One input of each comparator is tied to the signal input pin 5. The other input is tied to the intersection of two resistors in a voltage divider made up of 10 resistors connected in series. The ends of the voltage divider appear at pins 4 and 6 of IC208.

Normally the voltage divider is connected between ground and a reference voltage. An input signal that is increased from zero to the reference voltage will turn on the firt L.E.D. at 10 percent of the reference level, the second at 20 percent of the reference voltage, etc. until the tenth L.E.D. is turned on when the input equals the reference voltage. The outputs of the L.E.D. driver are "open collector" configurations which means that the output acts like a switch with one side connected to ground. One side of a load (resistors R229 through R232) must be connected to a low impedance voltage source that will supply the load current when the L.E.D. driver switches the other end to the ground.

IC212 and 213 are band gap precision 1.2 V reference voltage sources that are connected to provide bipolar reference voltages. Resistors R234 and R239 and potentiometers R235 and R238 are connected in series with the two ends of the voltage divider in the L.E.D. driver IC208. These components permit the voltage across the resistance voltage divider in L.E.D. driver IC208 to be adjusted to establish the sensitivity of the L.E.D. driver (input voltage step required to turn on each L.E.D.). The addition of capacitors C218 and C219 creates a low pass filter that prevents any transient fluctuations from appearing at the voltage divider of IC208. In this application, the voltage across the divider network is adjusted asymetrically to move the zero voltage level upward on the ladder to the point that it is exactly centered between the input voltage required to turn on either of the two yellow (+Y and −Y outputs) L.E.D.'s in a display axis of the visual display unit. This is necessary to cause circuit operation to be centered about the four uppermost and consecutive outputs of the L.E.D. driver because only four of the ten available outputs are required.

There are five L.E.D.'s in any display axis, (two yellow, two red and one green L.E.D.). The green L.E.D.'s are effectively "on" all the time, so only the four L.E.D. outputs +R, +Y, −Y and −R are needed to control the five L.E.D.'s in any display axis. The other outputs are tied together and to the output of comparator IC209A. This comparator prevents the −R output from turning off when the input voltage swings below the trip point for the "−R" L.E.D. in any display axis. One side of the comparator is connected to the signal input and the other side is referenced to a voltage divider formed by resistors R236 and R237 which are selected to set this reference voltage to cause the comparator to switch to a logic low level at the same time the "−R" L.E.D. is pulled to a logic low by the L.E.D. driver. Resistor R228 limits the current flow to the comparator to set the minimum output of the comparator to a logic low and capacitor C220 filters transients from the comparator reference input.

The comparator is effectively "or tied" such that either the comparator in the L.E.D. driver IC208 or the external comparator IC209A can switch the −R line to a near ground logic low. When the input voltage falls below the trip point for the comparator in the L.E.D. driver IC208, the internal comparator output will try to go to a logic high but the external comparator will hold the logic low condition for any more negative swing of the input signal.

The integral L.E.D. driver logic prevents the +R line from switching to a logic high for positive signal voltages that exceed the most positive voltage on the internal voltage divider, therefore both red (−R and +R) L.E.D. driver line will remain at a logic low when the bipolar input voltage exceeds the reference levels set up on the internal voltage divider in IC208.

It is significant to note that the L.E.D. driver is normally set up to provide a 75 milivolt step between each of the four L.E.D. driver outputs whereas the full scale signal input may swing as much as ±2 volts. This biasing scheme for the L.E.D. driver establishes a very high sensitivity near the zero voltage level that represents the aligned condition for the position sensing device vertical or Z axis while also maintaining the red L.E.D.'s in the "on" condition when the input voltage far exceeds the maximum reference (far out of alignment) to indicate the direction that the position sensing device must be moved to establish alignment.

Resistor R227 establishes a limit to the current that can be drawn into or "sinked" by each output of the L.E.D. driver. Resistors R229 through R232 pull the four L.E.D. driver outputs to a logic high when the outputs are not "turned on" or pulled to a logic low by the L.E.D. driver. IC207 is a one shot that produces a pulse with a duration determined by potentiometer R226 and capacitor C213. This pulse delays the turn on of the selected L.E.D. because digital devices tend to turn off more slowly than they turn on and this causes ghosting or flickering of any L.E.D. that is not quite fully off when the next L.E.D. is turning on. The time delay allows full turn off before the next L.E.D. can be turned on.

IC210 is a ripple counter that divides the previously divided by 5 clock pulse on this multiplexer address line down to a 2 Hz clock that is used to "blink" all or portions of the visual display when the limit conditions are created.

Sections B and C of comparator IC209 are biased by resistors and potentiometers R241 through R248 to switch to a low output when the vertical position signal approaches the maximum or minimum full scale level. The maximum level indicates that the sensing device is "above the target" and all signals are invalid. The minimum level indicates that the sensing device is fully collapsed to an "over range" position and the vertical position signal is invalid. Resistors R249 through R252 form voltage dividers that transform the comparator outputs to a logic low signal. These comparator outputs are routed to buss pins 14 and 16 for use by the analog to digital conversion circuitry of FIGS. 12a-d, described below.

IC214 is a multiplexer which is used as a static logic element. When comparator IC209C goes low, a 5 volt signal is connected to the vertical digits voltmeter in the visual display, causing the display to over range and display −1. When comparator IC209B goes low, the 2 Hz clock signal from IC210 is conected to the visual display multiplexer disable input, causing all displays to blink at the 2 Hz rate.

IC211 is a combination logic chip containing inverter sections A and F, two input NOR section B and two input NAND section D. The NOR output will be high only when the two multiplexer address lines that are connected to the inputs are both low. This occurs when either one of the two horizontal probe axes are selected.

The lateral position sensing probe of the sensing device will be forced into the body of the sensing device if it is brought down on a surface without a target hole or if the sensing device is positioned at an extreme horizontal offset from the target hole, forcing the probe to climb the slope of the tapered hole and disappear into the body of the sensing device. When this happens, an internal switch formed by members 72 and 82 in the sensing device 10 is closed, pulling the input to inverter section A to a logic low. The inverted logic high signal will enable gate section C such that when the NOR section output goes high when the horizontal position signals are selected by the multiplexer, the output of gate section C will go low. This signal is coupled to buss pin 15 for use by the analog to digital conversion circuit of FIGS. 12a-d.

IC214 will connect the 2 Hz clock pulse to the visual display multiplexer disable input, causing just the horizontal position L.E.D. displays to blink, indicating the displayed horizontal position data is not usable.

Figures 16, 17:
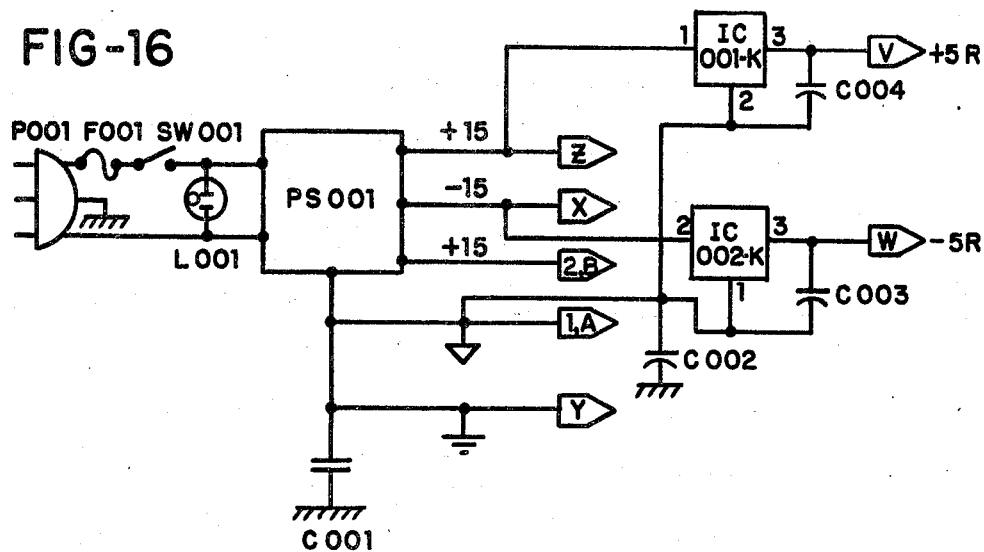
Figure 18:
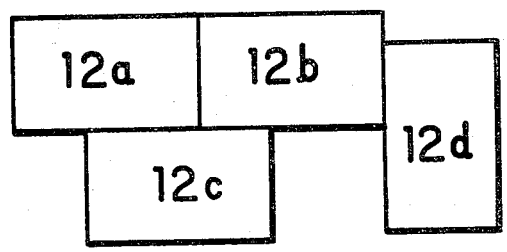
Figure 19:
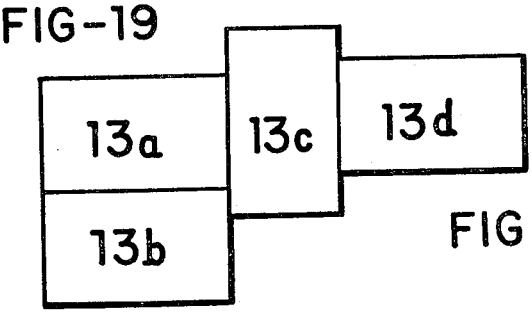
Figure 20:
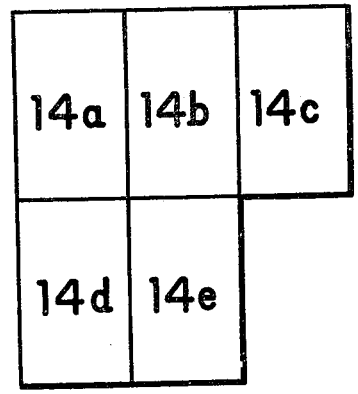
Figure 21:
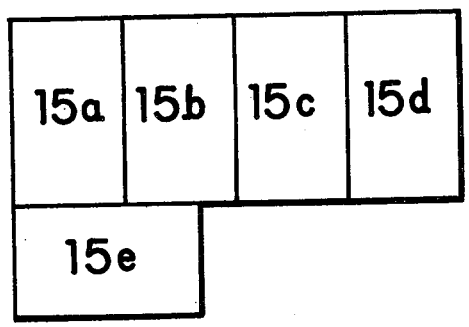

The remaining capacitors C229 through C235 help to minimize the transient voltage changes on the syste supply buss of FIG. 17 and bypass to ground any high or low frequency AC components that may get on the system power supply lines from external noise sources.

In addition to the digital display in the format illustrated in FIG. 22, since the present invention is directed in one aspect to the "teaching" of an industrial robot as opposed to a real time indicator of position relative to an external surface which is provided by the above described circuitry, it is important to be able to relate this data received from the sensing device 10 directly into the computer storing the information controlling the movements of the sensing device. In that regard, the circuitry of FIGS. 12a-d is utilized to effect this result.

The five channels of analog data from the input circuit of FIGS. 15a-e are multiplexed into an A/D (analog to digital converter) and converted into 10 bit, 2's complement digital data which is transmitted to the customer's computer (not shown) as two eight bit bytes via a standard RS232 port.

When power is applied to the circuit, IC308 generates a low to high logic pulse which resets the UART (universal asynchronous receiver and transmitter), IC301. The parallel data output bits RR1-RR8 and the "data received" line DR go to a TTL logic low. The serial output line TRO goes to a TTL high which is converted to RS232 levels by levels shifter IC302 and transmitted to the customer's computer. Flip flop IC307 is also reset when the same pluse is coupled to the RD input of IC307 through inverter sections B and E of IC314 and NAND gate section C of IC315.

The Q output flip flop IC307 goes high at reset, forcing the "blank and convert" input of the A/D converter ID309 to a logic high which resets the convertor, and blanks (disconnects) the convertor's data lines MSB through DI from the remaining circuit. The customer computer initiates circuit action by serially transmitting an 8 bit byte via the RXD line to RS 232 receiver IC303 which converts the logic levels of the serial pulse train to the TTL levels and routes it to the serial data input line of IC301. IC301 converts the serial data to an 8 bit parallel byte, outputs same on RR1 through RR8 and sets the data received line to a logic high. The bits RR1 through RR3 present a 3 bit BCD address code to multiplexer IC312 which connects the addressed or selected channels to the high speed buffer amplifer IC313. This amplifier presents a high impedance output to the multiplexer output and negates any effect from the small "on" resistance of the multiplexer switch. The low output impedance of the amplifier provides an ideal source impedance for the low input impedance of the A/D convertor.

The output of the buffer amplifier passes through potentiometer R304 which provides a 1 to 3 LSB (least significant bit) trim of the full scale calibration of the A/D convertor. Bit RR5 from IC301 is the A/D convertor start conversion control bit. This bit is set high at the same time the address bits RR6—RR8 are set so a time delay must be provided to allow the multiplexer to select an analog data channel and the buffer amplifier to settle to the final value of the analog input before an A/D conversion is initiated. When bit RR5 goes high, the $\overline{Q}$ output of one shot IC308B goes low and then returns to a high after a fixed time delay determined by R307 and C302. This low to high transition clocks flip flop IC307 and shifts $\overline{Q}$ to a logic low which initiates a conversion cycle in the A/D convertor IC309. The data ready output of the convertor momentarily goes high to indicate a conversion is in process and then returns to a logic low when the data conversion is complete. This output is coupled to the RS232 transmitter IC302 where it is converted to RS232 levels and transmitted to the customer's computer to indicate that the conversion is complete.

The A/D convertor outputs are now holding a bit pattern analogous to the level of the analog signal that was just converted. The digital outputs are now enabled (connected) to the two eight bit wide tristate buffers, IC310 and IC311. These buffers share a common eight bit wide data path to the transmit data port or register of the UART, IC301. The outputs of the buffers are controlled by the output enable $\overline{OEA}$ and $\overline{OEB}$ inputs that tristate (switch the output to a high impedance) to turn off the buffer when this input is set to a logic high level.

Bit two of the data received byte from the UART IC301 determines which buffer is connected to the UART transmit port. This bit is tied directly to the IC311 and through inverter section D of IC313 to IC310. The first control byte from the customer's computer will set this bit high, connecting IC310 outputs to the transmit port of IC301. Data bits 8 and 9 (MSB), a decimal point flag and three status bits are now serially transmitted by UART IC301. IC301, Pin 28 now has the decimal point flag bit that is low when either of the perpendicularity axes of the RTS are selected for conversion. This bit can be used to shift the decimal point of a customer's display of the digital data to permit output in true engineering units without a decimal adjust operation in the customer's computer.

When each data byte is received from the customer's computer, the data ready line DR of the UART IC301 goes to a logic high which clocks the dual one shot IC306. $\overline{Q1}$ goes low and Q1 goes high for a period determined by R311 and C308. Q1 clocks the second section of IC306 when it returns to the high state following this first time delay. $\overline{Q1}$ immediately resets the UART data received line DRR so that the UART may accept the next data byte.

Q2 now goes to a logic high for a period determined by R312 and C309. This output and the transmit control bit RR3, which is normally maintained at a logic high level, cause a momentary low pulse to appear at the output of the NAND gate, section D of IC315. This pulse strobes the THRL line of IC315 loading the UART and initiating a data transmission of the data byte presented to TR1 through TR8 of UART IC301 when THRL returns to a logical high. The serial pulse train data immediately appears at the TR0 line of IC301. It is converted to an RS232 logic level by the RS232 transmitter IC302 and transmitted to the customer's computer via the TXD line in the interconnecting cable.

The customer's computer now sends a second byte which sets RR1, RR2 and RR4 low and RR5 and RR6 high. Bit RR2 enables IC311 connecting it to the data output TR1 through TR8 of IC301. Buffer IC301 is now turned off. Data bits 0 (LSB) through 7 now appear at TR1 through TR8 respectively. The previously defined time delay and output strobe pulse from IC306 and section D of IC315 now occurs and the second data byte is transmitted. The low to high transition of this pulse is coupled to one shot IC320 where it clocks the one shot causing $\overline{Q1}$ to go high for a period determined by R301 and C303. Since the reset control bit 5 was set high when the second control byte was received from the customer's computer, the output of the NAND gate section B of IC315 will now go low, causing flip flop IC307 to reset via the logic path through section C of IC315 and section E of the inverter IC314. The circuit is now ready to start a second cycle.

IC318 and IC319 are miniature 12 volt regulators which reduce the ±15 volt supply level to the ±12 volts required by the RS232 transmitter and receiver, IC302 and IC303. IC305 is a dual band rate generator that divides down the 5.0688 MH$_z$ Xtal frequency to two indpendent clock signals. The Fr output clocks the UART, IC301 and the second clock signal is further divided down by ripple counter IC304 to provide system timing signals for use by other circuitry as described above.

Inverter section A of IC314 inverts the MSB from the A/D convertor to change the data format from offset binary to 2's complement.

Capacitors C305 and C306 limit the slew rate of the RS232 transmitter to 30V/microsecond to conform with the RS232 sepecifications. The remaining capacitors in the circuit provide transient filtering and noise suppression functions.

FIG. 16 illustrates the power supply for the above described circuitry in the position sensing device of FIG. 1. PS001 is a commercial switching type power supply and provides the required ±15 volt analog power source and the +5 volt digital logic power source. L001 is a power indicator and F001 the system fuse. IC001 and IC002 are three terminal voltage regulators that reduce the ± voltage supplies to ±5 volts to create the ±5 volts regulated voltage source. Capacitors C003 and C004 stabilize the output of the voltage regulators IC001 and IC002. Capacitor C001 decouples any case to power supply noise. Capacitor C002 decouples noise on the common ground return from IC001 and IC002 to chassis ground.

It is to be understood that the above described circuitry is one means of providing the desired visual indication of movements of the sensing device 10 and that other circuit constructions can be utilized in conjunction with the device to provide either the same visual indications or other indications such as those described in the above referred to related applications. For the sake of clarity, a list of components used in the construction of the above described circuitry is set out below, but is not to be construed as a limitation on the construction of the circuitry portion of the present invention.

| A/D and RS232 OF FIGS. 12a-d | | | | |
|---|---|---|---|---|
| R301 | Resistor | ¼W | Carbon | 4.7K ohm |
| R302 | Resistor | Not used | | |
| R303 | Resistor | Not used | | |
| R304 | Pot | Bourns | 3006P | 50 ohm |
| R305 | Resistor | ¼W | Film | 4.7K ohm |
| R306 | Resistor | ¼W | Film | 10 ohm |
| R307 | Resistor | ¼W | Carbon | 4.7K ohm |
| R308 | Pot | Bourns | 3006P | 10K |
| R309–R312 | Resistor | ¼W | Carbon | 2.2K ohm |
| C301 | Capacitor | | Ceramic | 1000 pf |
| C302 | Capacitor | | Ceramic | 1000 pf |
| C303 | Capacitor | | Ceramic | 1 MFD |
| C304 | Capacitor | | Ceramic | 1000 pf |
| C305–C307 | Capacitor | | Ceramic | .1 MFD |
| C308 | Capacitor | | Ceramic | 1000 pf |
| C309 | Capacitor | | Ceramic | 1000 pf |
| C310–C312 | Capacitor | | Ceramic | .1 MFD |
| C313 | Capacitor | | Tantalum | 10 MFD 25 V |
| C314–C317 | Capacitor | | Ceramic | .1 MFD |
| C318 | Capacitor | | Ceramic | 1.0 MFD |
| C319 | Capacitor | | Ceramic | 1.0 MFD |
| IC301 | Integrated Circuit | TR1863 | Western Digital | |
| IC302 | Integrated Circuit | MC1488 | Motorola | |
| IC303 | Integrated Circuit | MC1789 | Motorola | |
| IC304 | Integrated Circuit | MC14040BCP | Motorola | |
| IC305 | Integrated Circuit | BR1941 | Western Digital | |
| IC306 | Integrated Circuit | 74221 | Tex. Inst. | |
| IC307 | Integrated Circuit | 7474 | Tex. Inst. | |
| IC308 | Integrated Circuit | 74221 | Tex. Inst. | |
| IC309 | Integrated Circuit | AD571KD | Analog Devices | |
| IC310 | Integrated Circuit | 72LS244 | Tex. Inst. | |
| IC311 | Integrated Circuit | 74LS244 | Tex. Inst. | |
| IC312 | Integrated Circuit | MC14051BCP | Motorola | |
| IC313 | Integrated Circuit | MC34001AP | Motorola | |
| IC314 | Integrated Circuit | 7404 | Tex. Inst. | |
| IC315 | Integrated Circuit | 7400 | Tex. Inst. | |
| IC316 | Not used | | | |
| IC317 | Not used | | | |
| IC318 | Voltage Regulator | UA78LIZAWC | Fairchild | |
| IC319 | Voltage Regulator | MC79LIZACP | Motorola | |
| IC320 | Integrated Circuit | 74123 | Tex. Inst. | |
| IC321 | Diode | IN34A | | |
| IC322 | Diode | IN34A | | |
| IC323 | Circuit | 7408 | Tex. Inst. | |
| Integrated | | | | |
| CON301 | Integrated Circuit | 14 pin Socket | | |

| VISUAL DISPLAY OF FIGS. 13a-d | | | | |
|---|---|---|---|---|
| R401 | Resistor | ¼W | | 1.5K |
| R402 | Pot | Bourns | 3006P | 25K |
| R403 | Resistor | ¼W | | 100K |
| R404 | Resistor | ¼W | | 1 meg |
| R405 | Resistor | ¼W | | 470K |
| R406 | Resistor | ¼W | | 150 ohm |
| R406 | Resistor | ¼W | | 150 ohm |
| C401 | Capacitor | 15UF | | Tantalum |
| C402 | Capacitor | 15UF | | Tantalum |
| C403–C414 | Capacitor | 0.1UF | | Monolithic |
| C415 | Capacitor | 100 PF | | Mylar |
| C416 | Capacitor | .01 UF | | Polypropylene |
| C417 | Capacitor | .1UF | | Polypropylene |
| C418 | Capacitor | .047 | | Polypropylene |
| C419 | Capacitor | .22 | | Polypropylene |
| CON401 | Integrated Circuit | 20 pin Socket | | |
| IC401 | Integrated Circuit | MC14040BCP | | Motorola |
| IC402 | Integrated Circuit | 74LS244 | | National |
| IC403 | Integrated Circuit | Q2T3725 | | Tex. Inst. |
| IC404 | Integrated Circuit | Q2T3725 | | Tex. Inst. |
| IC405 | Integrated Circuit | MC14051BCP | | Motorola |
| IC406 | Resistor | SIP Pack | 4310-101-104 | Bournes |
| IC407 | Integrated Circuit | ICL7107CPL | | Intersil |
| SW401 | Switch | JMT-232 | | JBT |
| LED401 | LED Display | 5082-7736 | | Hewlett Packard |
| LED402/404 | LED Display | 5082-7731 | | Hewlett Packard |
| LED405 A,E,G,J,K,O,P,S,U,W,Z | LED | HLMP-1302 Red | | Hewlett Packard |
| LED405 B,D,F,H,L,N,Q,R,T,V,Y | LED | HLMP-1402 Yellow | | Hewlett Packard |
| LED405 C,M,I X | LED | HLMP-1503 Green | | Hewlett Packard |

Figure 14A:
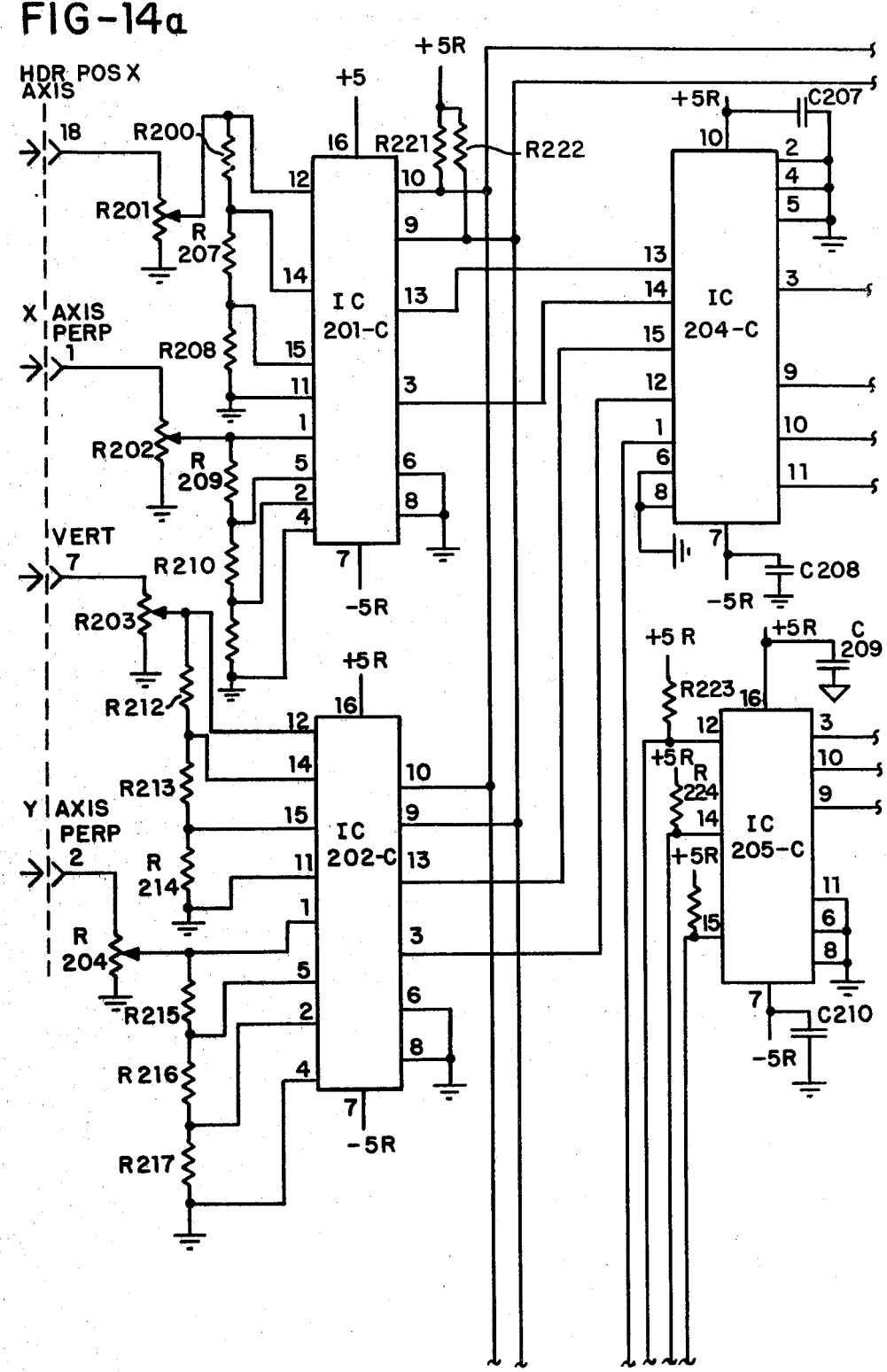
Figure 14B:
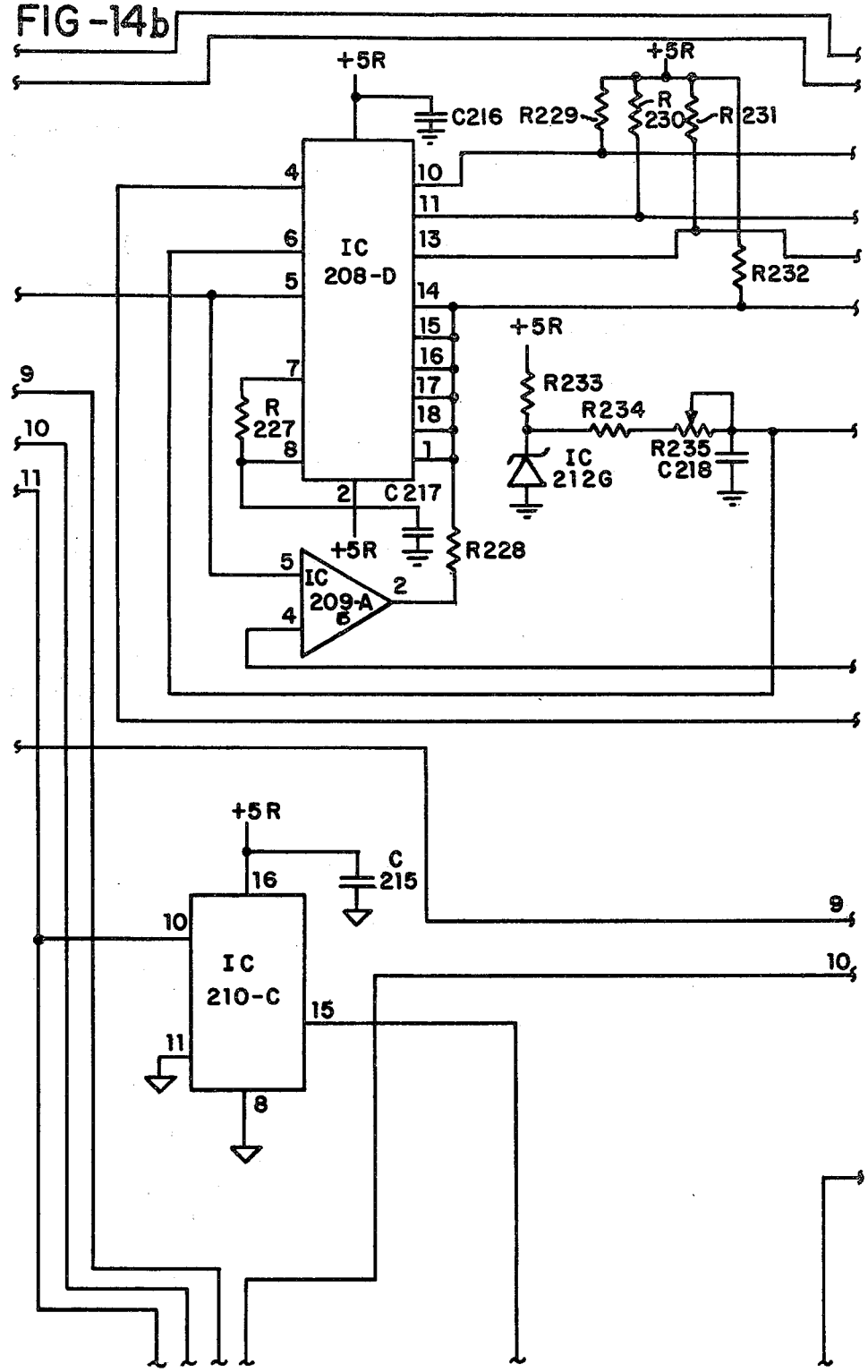
Figure 14C:
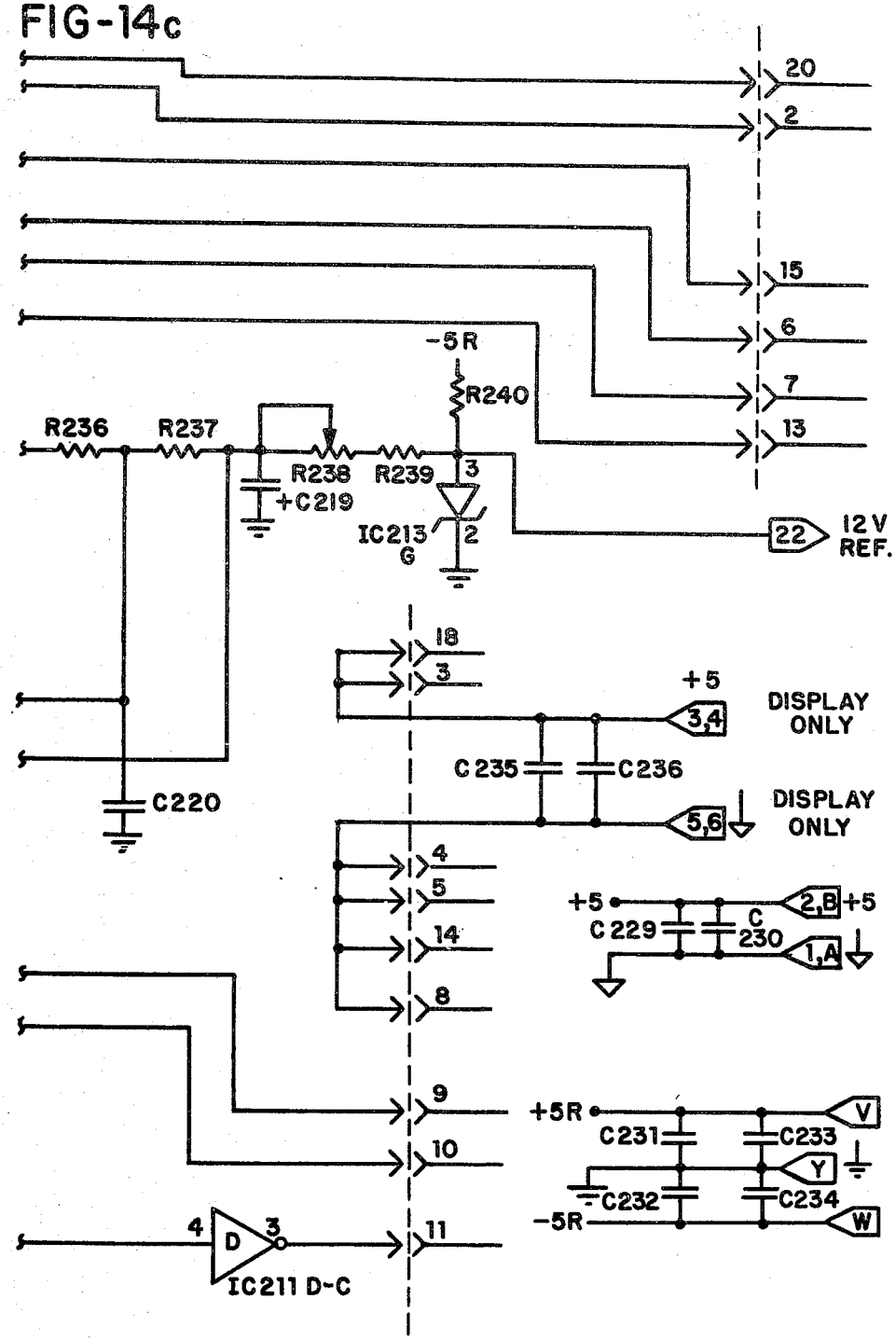
Figure 14D:
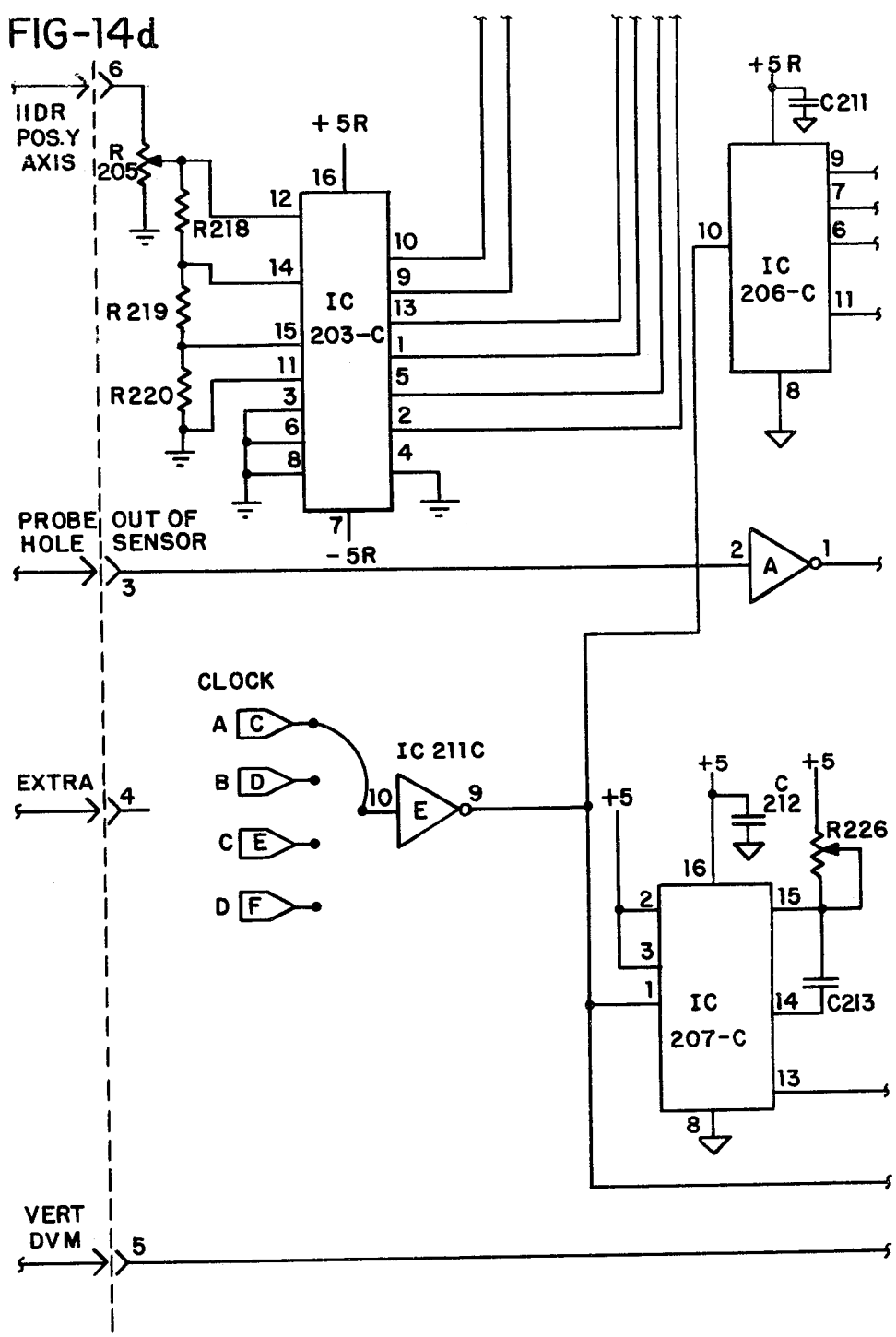
Figure 14E:
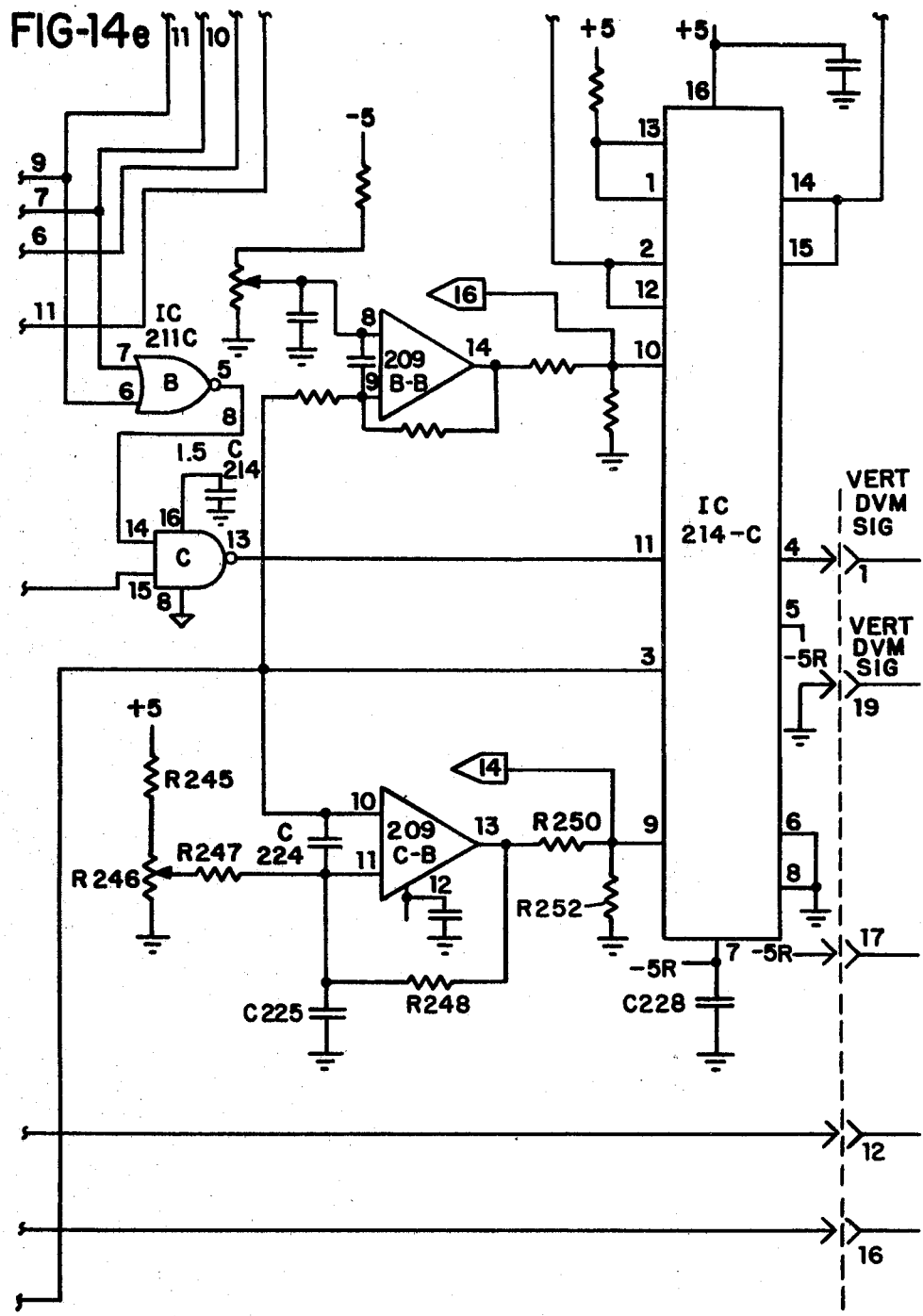
Figure 15A:
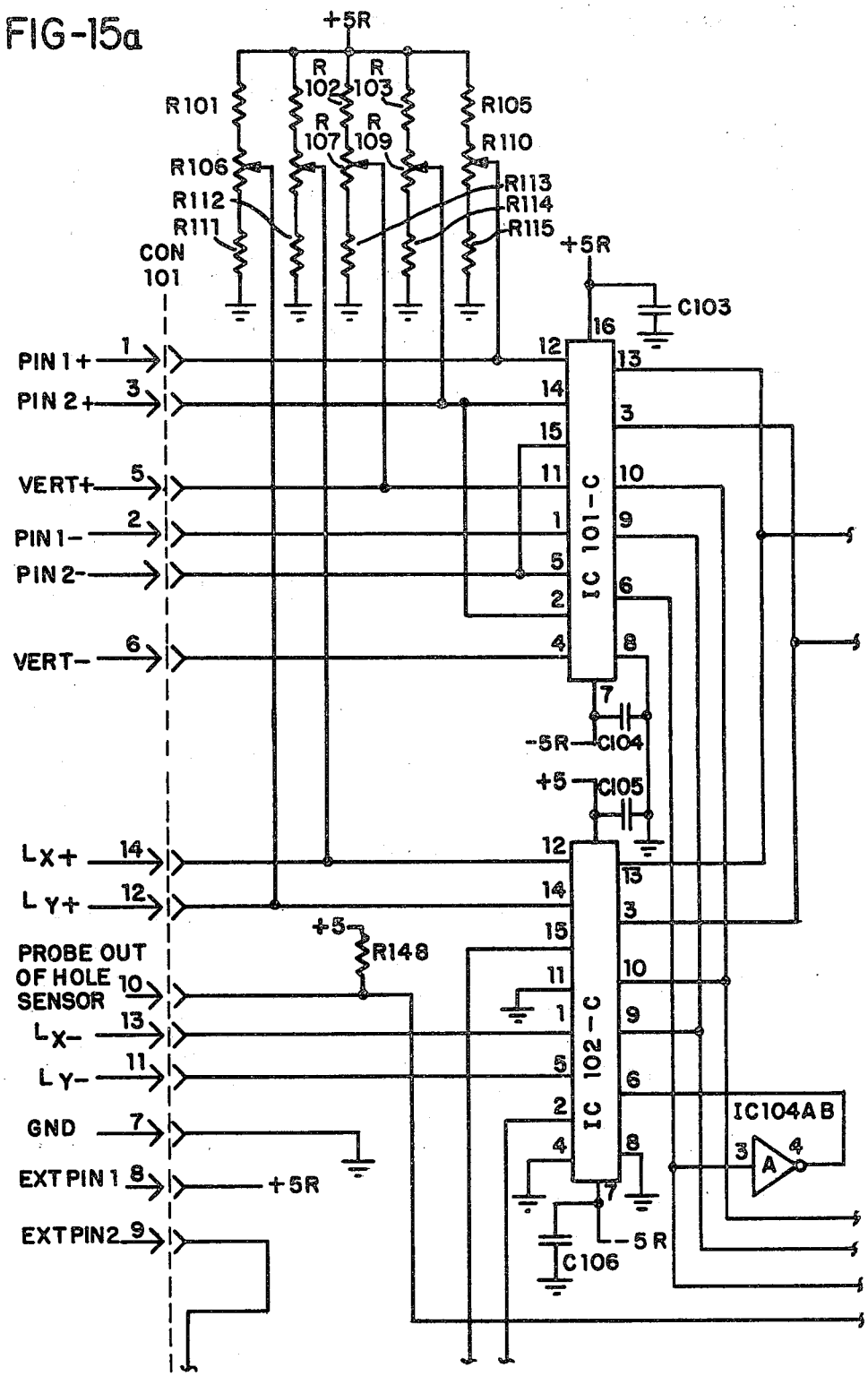
Figure 15B:
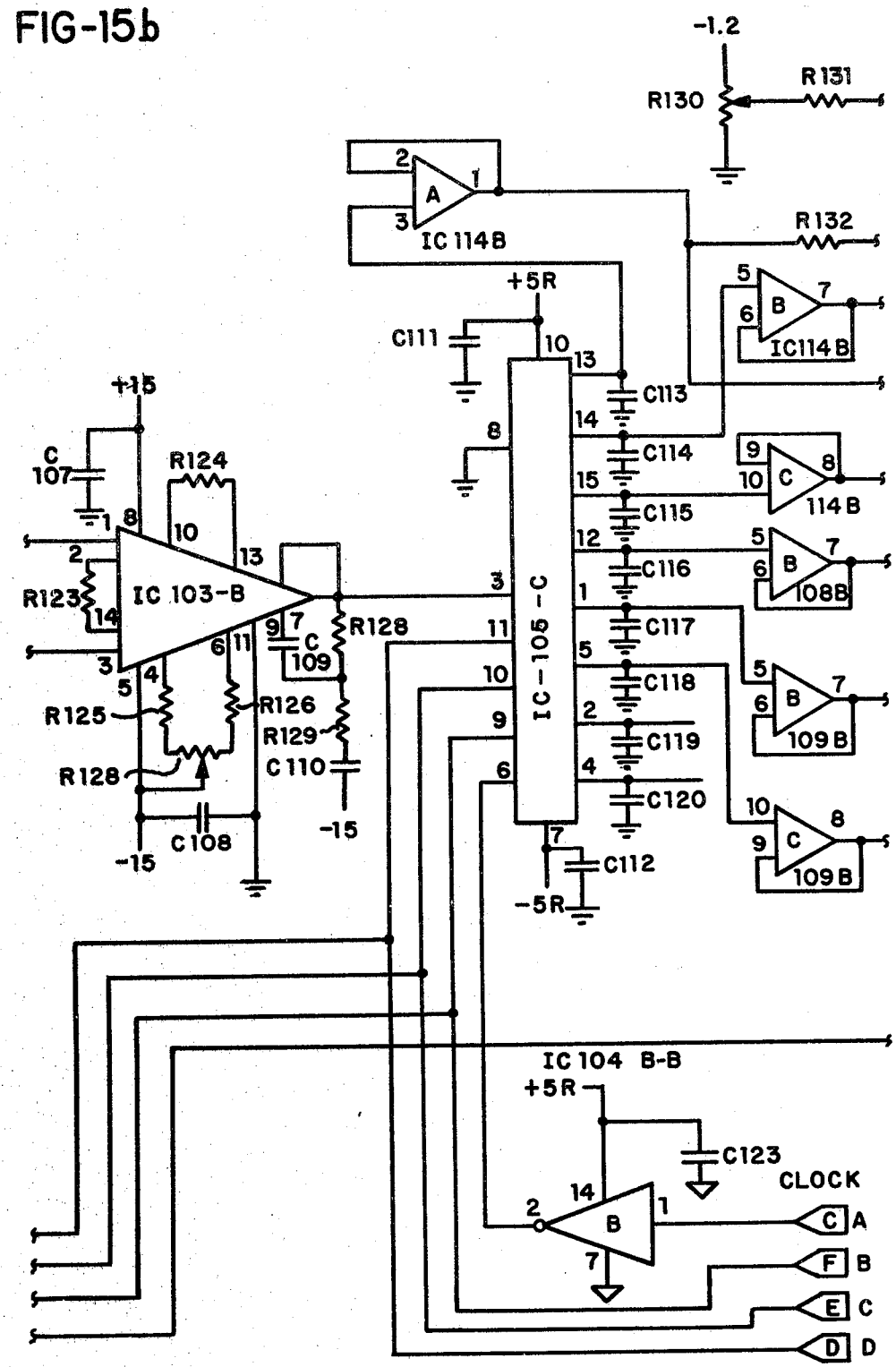
Figure 15C:
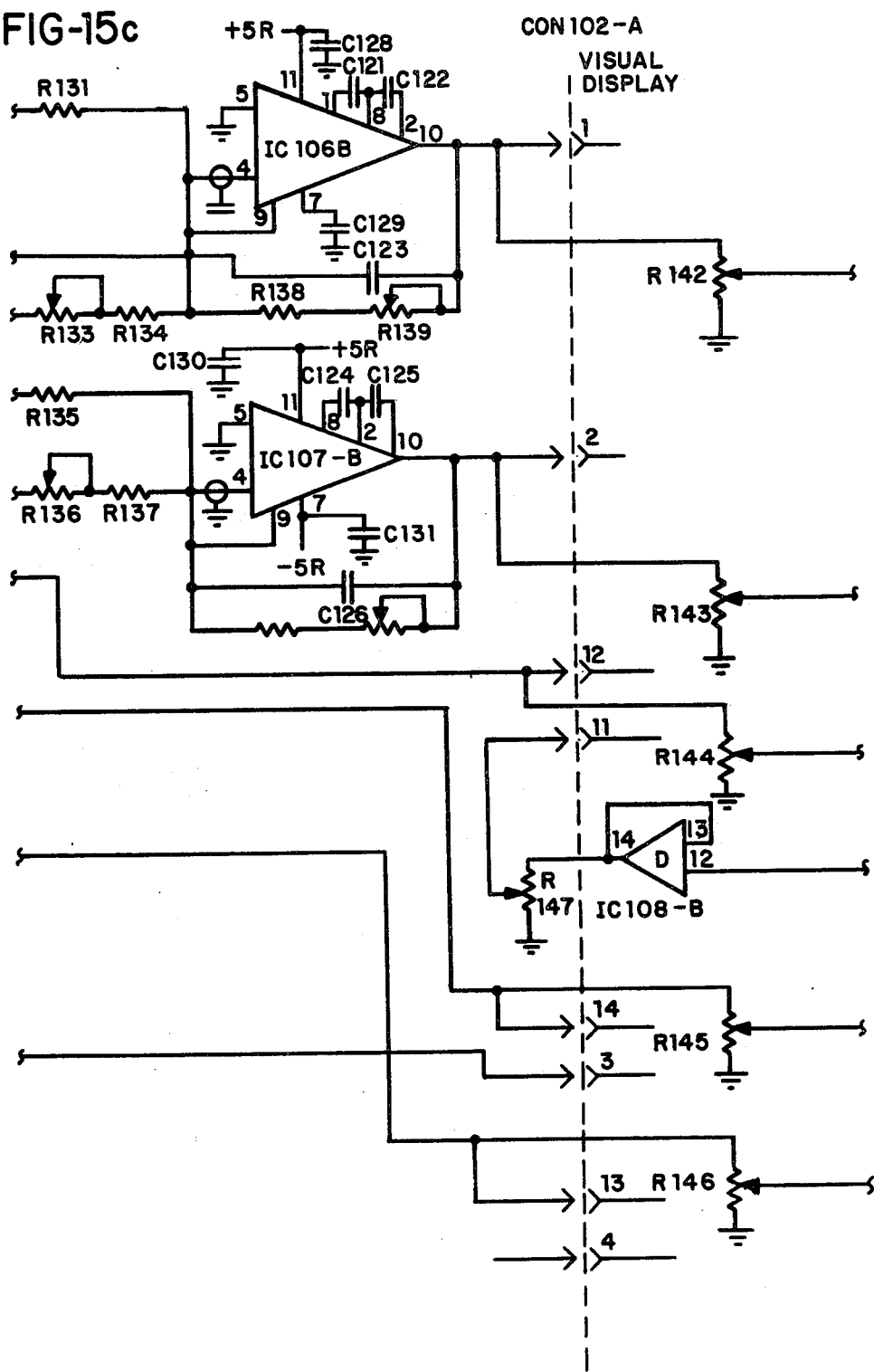
Figure 15D:
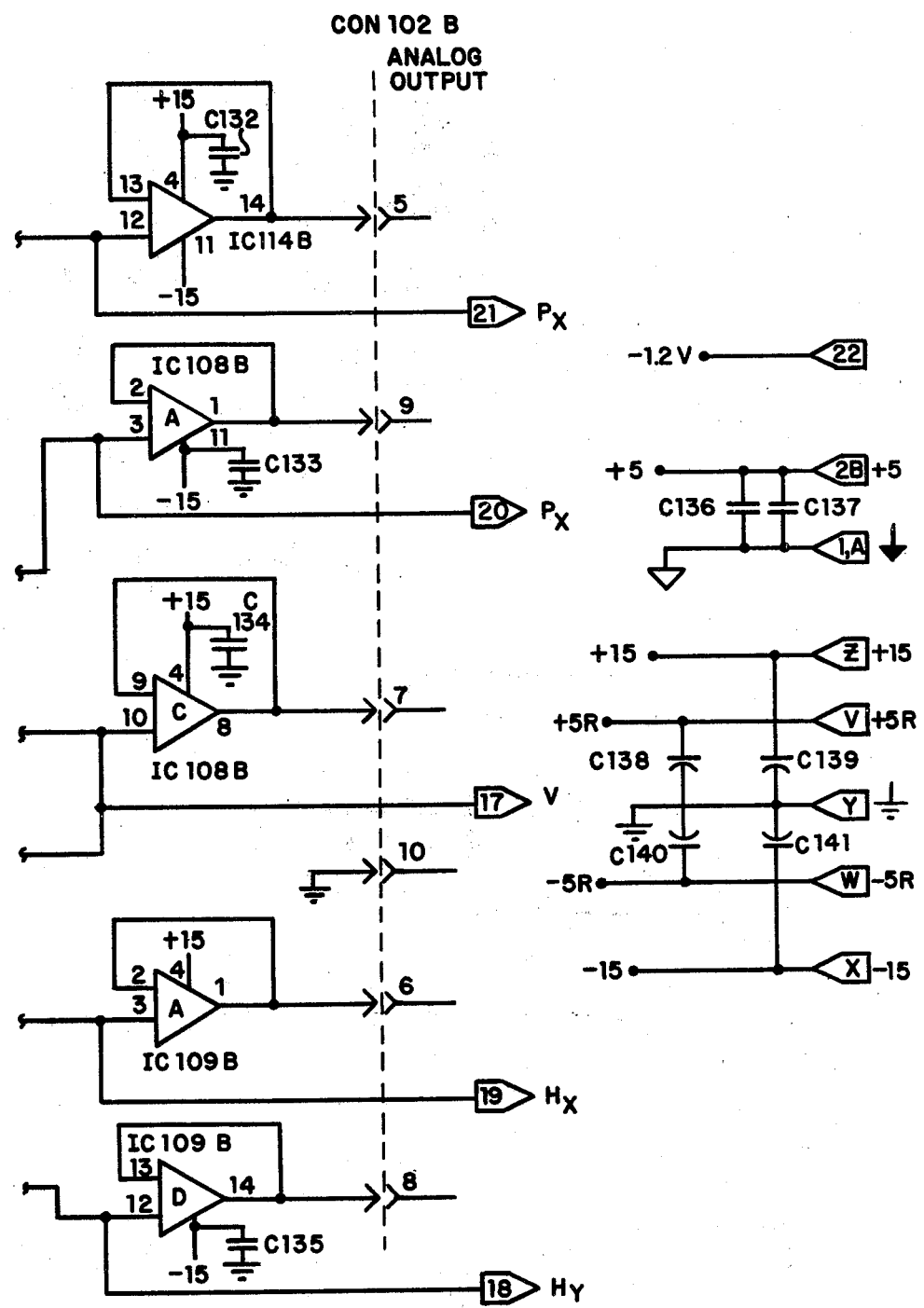
Figure 15E:
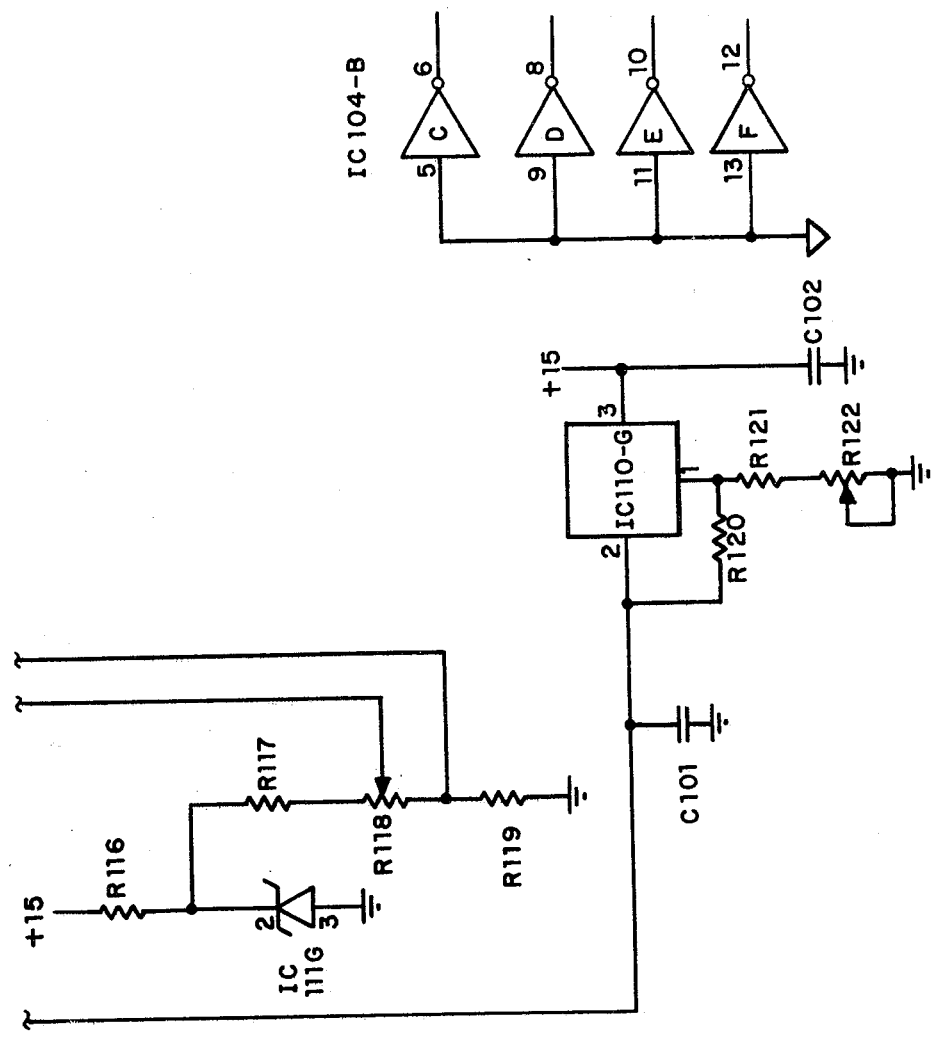

| DISPLAY DRIVER BOARD OF FIGS. 14a-c | | | | |
|---|---|---|---|---|
| R201 | Pot | Bourns | 3006P | 20K |
| R202 | Pot | Bourns | 3006P | 50K |
| R203 | Pot | Bourns | 3006P | 20K |
| R204 | Pot | Bourns | 3006P | 50K |
| R205 | Pot | Bourns | 3006P | 20K |
| R206–R220 | Resistor | ¼W | Film | * |
| R221–R225 | Resistor | ¼W | Carbon | 10K |
| R226 | Pot | Bourns | 3006P | 10K |
| R227 | Resistor | ¼W | Carbon | 2.2K |
| R228 | Resistor | ¼W | Carbon | 820 ohm |
| R229–R232 | Resistor | ¼W | Carbon | 1.2K |
| R233 | Resistor | ¼W | Film | 820 ohm |
| R234 | Resistor | ¼W | Film | * |
| R235 | Pot | Bourns | 3006P | 2K |
| R236 | Resistor | ¼W | Film | 18K |
| R237 | Resistor | ¼W | Film | 33K |
| R238 | Pot | Bourns | 3006P | 2K |
| R239 | Resistor | ¼W | Film | * |
| R240 | Resistor | ¼W | Film | 820 ohm |
| R241 | Resistor | ¼W | Film | * |
| R242 | Pot | Bourns | 3006P | 10K |
| R243 | Resistor | ¼W | Film | 10K |
| R244 | Resistor | ¼W | Film | 10 meg |
| R245 | Resistor | ¼W | Film | * |
| R246 | Pot | Bourns | 3006P | 10K |
| R247 | Resistor | ¼W | Film | 10K |
| R248 | Resistor | ¼W | Film | 10 meg |
| R249 | Resistor | ¼W | Carbon | 1.5K |

-continued

| DISPLAY DRIVER BOARD OF FIGS. 14a-c | | | | |
|---|---|---|---|---|
| R250 | Resistor | ¼W | Carbon | 1.5K |
| R251 | Resistor | ¼W | Carbon | 1.2K |
| R252 | Resistor | ¼W | Carbon | 1.2K |
| R253 | Resistor | ¼W | Carbon | 10K |
| C207–C212 | Capacitor | | 0.1 UF | Monolithic |
| C213–C217 | Capacitor | | .001 UF | Monolithic |
| C218 | Capacitor | | 220 UF | Electrolytic |
| C219 | Capacitor | | 220 UF | Electrolytic |
| C220–C228 | Capacitor | | 0.1 UF | Monolithic |
| C229 | Capacitor | | 15 UF | Tantalum |
| C230–C234 | Capacitor | | 0.1 UF | Monolithic |
| C235 | Capacitor | | 15 UF | Tantalum |
| C236 | Capacitor | | 0.1 UF | Monolithic |
| IC201–IC203 | Integrated | Circuit | MC14052BCP | Motorola |
| IC204 | Integrated | Circuit | MC14051BCP | Motorola |
| IC205 | Integrated | Circuit | MC14052BCP | Motorola |
| IC206 | Integrated | Circuit | MC14040BCP | Motorola |
| IC207 | Integrated | Circuit | 74123 | Tex. Inst. |
| IC208 | Integrated | Circuit | LM3914 | National |
| IC209 | Integrated | Circuit | LM339 | National |
| IC210 | Integrated | Circuit | MC14040BCP | Motorola |
| IC211 | Integrated | Circuit | MC14572UBCP | Mototola |
| IC212 | Voltage | Reference | LM385BZ | National |
| IC213 | Voltage | Reference | LM385BZ | National |
| IC214 | Integrated | Circuit | MC14053BCP | Motorola |
| CON201 | Integrated | Circuit | 8 Pin Socket | |
| CON202 | Integrated | Circuit | 20 Pin Socket | |

*Value to be selected at time of assembly.

| INPUT BOARD OF FIGS. 15a-e | | | | |
|---|---|---|---|---|
| R101–R105 | Resistors | ¼W | Film | * |
| R106–R110 | Pot | Bourns | 3006P | 10K |
| R111–R115 | Resistor | ¼W | Film | * |
| R116 | Resistor | ¼W | Film | 2430 ohm |
| R117 | Resistor | ¼W | Film | 2430 ohm |
| R118 | Pot | Bourns | 3006P | 50 ohm |
| R119 | Resistor | ¼W | Film | 2490 ohm |
| R120 | Resistor | ¼W | Film | 270 ohm |
| R121 | Resistor | ¼W | Film | 470 ohm |
| R122 | Pot | Bourns | 3006P | 500 ohm |
| R123 | Resistor | ¼W | Film | 499 ohm |
| R124 | Resistor | ¼W | Film | 100K |
| R125 | Resistor | ¼W | FIlm | * |
| R126 | Resistor | ¼W | Film | * |
| R127 | Pot | Bourns | 3006P | 10K |
| R128 | Resistor | ¼W | Film | 24 ohm |
| R129 | Resistor | ¼W | Carbon | 7.5 ohm |
| R130 | Pot | Bourns | 3006P 1K | |
| R131 | Resistor | ¼W | Film | 1K |
| R132 | Resistor | ¼W | Film | 100K |
| R133 | Pot | Bourns | 3006P | 20K |
| R134 | Resistor | ¼W | Film | 90.9K |
| R135 | Resistor | ¼W | Film | 100K |
| R136 | Pot | Bourns | 3006P | 20K |
| R137 | Resistor | ¼W | Film | 90.0K |
| R138 | Resistor | ¼W | Film | 182K |
| R139 | Pot | Bourns | 3006P | 20K |
| R140 | Resistor | ¼W | Film | 182K |
| R141 | Pot | Bourns | 3006P | 20K |
| R142 | Pot | Bourns | 3006P | 50K |
| R142 | Pot | Bourns | 3006P | 50K |
| R144–R147 | Pot | Bourns | 3006P | 20K |
| R148 | Resistor | ¼W | Carbon | 10K |
| C101 | Capacitor | | 1.0 UF | Monolithic |
| C102–C108 | Capacitor | | 0.1 UF | Monolithic |

-continued

| INPUT BOARD OF FIGS. 15a-e | | | | |
|---|---|---|---|---|
| C109 | Capacitor | | .001 UF | Monolithic |
| C110–C122 | Capacitor | | 0.1 UF | Monolithic |
| C123 | Capacitor | | .033 UF | Monolithic |
| C124 | Capacitor | | 0.1 UF | Monolithic |
| C125 | Capacitor | | 0.1 UF | Monolithic |
| C126 | Capacitor | | .033 | Monolithic |
| C127–C135 | Capacitor | | 0.1 UF | Monolithic |
| C136 | Capacitor | | 15 UF | Tantalum |
| C137–C140 | Capacitor | | 0.1 UF | Monolithic |
| IC101 | Integrated | Circuit | MC14052BCP | Motorola |
| IC102 | Integrated | Circuit | MC14052BCP | Motorola |
| IC103 | Integrated | Circuit | AD521JD | Analog Devices |
| IC104 | Integrated | Circuit | MC14069UBCP | Motorola |
| IC105 | Integrated | Circuit | MC14051BCP | Motorola |
| IC106 | Integrated | Circuit | ICL7650CPL | Intersil |
| IC107 | Integrated | Circuit | ICL7640CPL | Intersil |
| IC108 | Integrated | Circuit | LF347BN | National |
| IC109 | Integrated | Circuit | LF347BN | National |
| IC110 | Integrated | Circuit | LM317H | National |
| IC111 | Integrated | Circuit | LM336Z-5.0 | National |
| IC114 | Integrated | Circuit | LF347BN | National |
| CON101 | Integrated | Circuit | 14 Pin Socket | |
| CON102 | Integrated | Circuit | 14 Pin Socket | |

Figure 23:
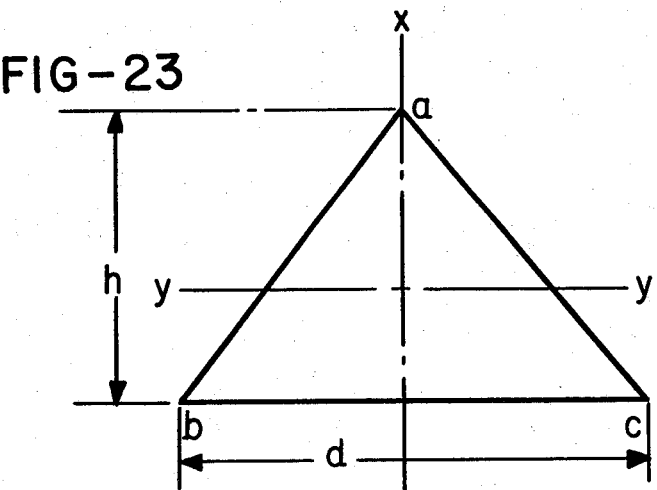
FIG. 23 is a schematic representation of a reference plane defined by the probes of the embodiment of FIG. 1.

Basically, what the above electronic circuit accomplishes is the calculation of the position of an imaginary reference plane established in the body of a sensing device by the position of th sensors, relative to the external surface under consideration. The angles and dimensions being evaluated are shown schematically in FIGS. 23 and 24. With reference to the embodiment of FIG. 1, in FIG. 23 point a corresponds to the reference probe 120 while points b and c correspond to the sensing probes 104 and 106, respectively.

As is mentioned above, the distance from points b and c to the intersection of the X and Y axes is equal to the distance from point a to the Y axis. The Z axis of the device extends perpendicular to the page of FIG. 23. It is to be understood, however, that these dimensions are not critical, particular, in a two sensing probe device. In other words, the distances from a, b and c to the intersection of the X and Y axis do not all have to be equal, although the calculations are more difficult if they are not. Therefore, for the sake of simplicity of calculations and ease of producing an analog equivalent circuit, the above-referred to distances are established in the preferred embodiment.

To make the necessary calculations, the following formulas are utilized which find their equivalent in the analog circuit described above. The angle A is the angle illustrated in FIG. 24 which is the slope of the reference plane with respect to the target surface TS. The angle B is the angle that the reference plane, established by the points a, b and c, makes with the plane of the target surface. Since the fixed reference pin is in the X axis, the tangents of angles A and B are in the form:

$$B = \tan^{-1}\left(\frac{b-c}{d}\right) \text{ and } A = \tan^{-1}\left(\frac{b+c}{2h}\right)$$

In the above calculations, the distances a, b and c are the indicated height of the probes with respect to the target surface.

Figure 24:
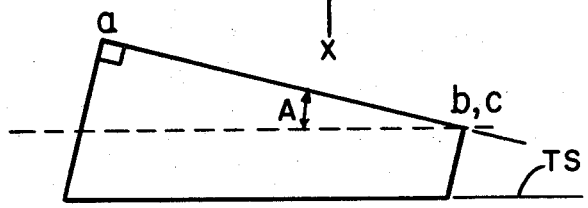
FIG. 24 is a schematic representation of the reference plane of FIG. 23 from a perpendicular direction and with the reference plane tilted with respect to a target surface.

It is to be noted that the right angle is always perpendicular to the reference plane, i.e., it is in the plane containing the X axis and is adjacent the reference plane as shown in FIG. 24 and not on the target surface TS. In this manner the tangent of the angle is always measured. Obviously, when the reference plane becomes parallel to the target surface the angles A and B will be zero and will indicate this condition of parallelism.

While the form of apparatus herein described constitute preferred multiple embodiments of this invention, it is to be understood that the invention is not limited to this precise form of apparatus, and that changes may be made therein without departing from the scope of the invention which is claimed in the appended claims.

What is claimed is:

1. A position sensing device, comprising:
   a support member;
   at least two angular position sensing probes movably mounted in spaced relation in said support member and extending therefrom to be engagable with an external surface, each said probe having a camming surface;
   a plurality of camming members movably mounted in said support member and each having a cam follower end engaging a respective said camming surface of said probes;
   a plurality of flexible members each engaging a respective camming member so as to be flexed by movement of said camming members upon movement of an associated probe;
   means mounted on each said flexible member for providing electrical signals indicative of the amount of bending thereof in response to movement of an associated probe; and
   means receiving said signals and providing an indication of the relative angular position of said support member to said external surface.

2. A position sensing device as defined in claim 1 including:
   said support member defining liquid supply cavities;
   each said probe defining liquid supply cavities interconnected to said cavities in said support member for receiving liquid therefrom, each said probe having an outer end defining an opening connected to said cavities in said probes and through which said liquid is expelled; and
   a metering orifice mounted in each said cavity in each said probe for controlling the volume of liquid expelled from said opening so as to support said probes on a hydrodynamic bearing formed by said liquid between said outer ends thereof and said external surface.

3. A position sensing device as defined in claim 1, including:
   a lateral position sensing probe movably mounted to said support member and extending therefrom for engaging a discontinuity in said surface so as to cause bending of said lateral position sensing probe upon lateral movement of said support member;
   transducer means engaging said lateral position sensing probe for sensing bending thereof and providing an electrical signal indicative of the degree of bending; and
   means receiving said signal from said lateral position sensing probe and providing an indication of the degree of bending of said lateral position sensing probe.

4. A position sensing device, comprising:
   a support member mountable for rotation about an axis;
   at least on angular position sensing probe movably mounted within said support member in spaced relation to said axis and extending from said support member for engagement with an external surface as said support member is rotated thereabove;
   transducer means mounted to said support member and engaging said probe for sensing movement thereof relative to said support member and providing at least two separate sets of electrical signals indicative of the position of said probe relative to said support member at at least two separate angular positions of said probe relative to said axis;
   means for sensing the angular position of said probe as it is rotated about said axis and providing at least two separate electrcal signals indicative of at least two separate angular positions of said probe about said axis; and
   means receiving said at least two sets of signals from said transducer means and from said means for sensing the angular position of said probe and providing an indication of the relative angular position of said support member to said surface.

5. A position sensing device as defined in claim 4 wherein said signal receiving means further provides an indication of the distance of said support member to said surface.

6. A position sensing device as defined in claim 4 or 5 wherein said at least one angular position sensing probe is mounted in said support member for rectilinear movement parallel to said axis.

* * * * *

UNITED STATES PATENT AND TRADEMARK OFFICE
CERTIFICATE OF CORRECTION

PATENT NO. : 4,455,754

DATED : Jun. 26, 1984

INVENTOR(S) : Harry L. Benjamin

It is certified that error appears in the above-identified patent and that said Letters Patent is hereby corrected as shown below:

Title page - block 63 - line 3, after "1980," the word "abandoned" should be deleted and the following substituted --now Pat. No. 4,338,723 issued July 13, 1982--

Column 11, line 34, "178" should be --1/2--

Column 13, line 62, "1-", first occurrence, should be --1+--

Column 13, line 62, "Pin 2-", first occurrence, should be --Pin 2+--

Column 18, line 28, "firt" should be --first--

Column 20, line 9, "conected" should be --connected--

Column 20, line 40, "syste" should be --system--

Column 21, line 54, "to turn" should be --or turn--

Column 23, lines 44, 45
"IC301    Integrated    TR 1863    Western
         Circuit"
should be
--IC301   Integrated    Circuit    TR1863    Western Digital--

Column 23, line 65,
"IC323    Circuit       7408       Tex. Inst."
should be
--IC323   Integrated    Circuit    7408      Tex. Inst.--

Column 24, line 7, "R406" should be --R407--

Column 25, line 52,
"R130     Pot           Bourns     3006P1K"
should be
--R130    Pot           Bourns     3006P     1K--

UNITED STATES PATENT AND TRADEMARK OFFICE
CERTIFICATE OF CORRECTION

PATENT NO. : 4,455,754

DATED : Jun. 26, 1984

INVENTOR(S) : Harry L. Benjamin

It is certified that error appears in the above-identified patent and that said Letters Patent is hereby corrected as shown below:

Column 25, line 64, "R142" should be --R143--

Column 26, line 19, "ICL7640CPL" should be --ICL7650CPL--

Column 26, line 31, "th" should be --the--

Column 26, line 43, "particular" should be --particularly--

Column 28, line 21, "on" should be --one--

Signed and Sealed this

Fifteenth Day of January 1985

[SEAL]

Attest:

Attesting Officer

GERALD J. MOSSINGHOFF

*Commissioner of Patents and Trademarks*